United States Patent
Kurtz et al.

(10) Patent No.: US 10,726,518 B2
(45) Date of Patent: *Jul. 28, 2020

(54) CAPACITY RESERVATION FOR VIRTUALIZED GRAPHICS PROCESSING

(71) Applicant: Amazon Technologies, Inc., Seattle, WA (US)

(72) Inventors: Douglas Cotton Kurtz, Sammamish, WA (US); Malcolm Featonby, Cape Town (ZA); Umesh Chandani, Seattle, WA (US); Adithya Bhat, Seattle, WA (US); Yuxuan Liu, Seattle, WA (US); Mihir Sadruddin Surani, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/530,888

(22) Filed: Aug. 2, 2019

(65) Prior Publication Data

US 2019/0355088 A1  Nov. 21, 2019

Related U.S. Application Data

(63) Continuation of application No. 15/376,399, filed on Dec. 12, 2016, now Pat. No. 10,373,284.

(51) Int. Cl.
*G06T 1/20* (2006.01)
*G06F 9/455* (2018.01)
(Continued)

(52) U.S. Cl.
CPC .............. *G06T 1/20* (2013.01); *G06F 9/455* (2013.01); *G06F 9/505* (2013.01); *G06F 9/5044* (2013.01);
(Continued)

(58) Field of Classification Search
None
See application file for complete search history.

(56) References Cited

U.S. PATENT DOCUMENTS 9,069,622 B2  6/2015 Post et al.
9,098,323 B2  8/2015 Mitra et al.
(Continued)

FOREIGN PATENT DOCUMENTS

WO  2014100558  6/2014

OTHER PUBLICATIONS

Jeff Weiss, et al., "NVIDIA Grid VCPU Deployment Guide for VMWare Horizon 6.1", NVIDIA TechPub, Mar. 1, 2015, Retrieved from URL: http://www.vmware.com/content/dam/digitalmarketing/vmware/en/pdf/products/horizon/grid-vgpu-deployement-guide.pdf, pp. 1-14.
(Continued)

*Primary Examiner* — Joni Hsu
(74) *Attorney, Agent, or Firm* — Robert C. Kowert; Kowert, Hood, Munyon, Rankin & Goetzel, P.C.

(57) ABSTRACT

Methods, systems, and computer-readable media for capacity reservation for virtualized graphics processing are disclosed. A request is received to attach a virtual GPU to a virtual compute instance. The request comprises one or more constraints. Availability information is retrieved from a data store that indicates virtual GPUs available in a provider network and matching the one or more constraints. A virtual GPU is selected from among the available virtual GPUs in the availability information. The selected virtual GPU is reserved for attachment to the virtual compute instance. The virtual compute instance is implemented using CPU resources and memory resources of a physical compute instance, the virtual GPU is implemented using a physical GPU in the provider network, and the physical GPU is accessible to the physical compute instance over a network.

20 Claims, 16 Drawing Sheets

(51) Int. Cl.
*G06F 9/50* (2006.01)
*G09G 5/00* (2006.01)

(52) U.S. Cl.
CPC .......... *G06F 9/5072* (2013.01); *G06F 9/5077* (2013.01); *G09G 5/006* (2013.01); *G06T 2200/28* (2013.01); *G09G 2370/022* (2013.01)

(56) References Cited

U.S. PATENT DOCUMENTS

| | | | |
|---|---|---|---|
| 9,787,659 | B2 | 10/2017 | Burch et al. |
| 9,912,609 | B2 | 3/2018 | Jacob et al. |
| 10,373,284 | B2 | 8/2019 | Kurtz et al. |
| 2011/0083131 | A1 | 4/2011 | Pirzada et al. |
| 2012/0069032 | A1 | 3/2012 | Hansson et al. |
| 2012/0154389 | A1 | 6/2012 | Bohan et al. |
| 2013/0014102 | A1 | 1/2013 | Shah |
| 2013/0179289 | A1* | 7/2013 | Calder .................. G06Q 30/08 705/26.3 |
| 2014/0055466 | A1 | 2/2014 | Petrov et al. |
| 2014/0176583 | A1 | 6/2014 | Abiezzi et al. |
| 2014/0215462 | A1 | 7/2014 | Kuo et al. |
| 2014/0286390 | A1 | 9/2014 | Fear |
| 2015/0067672 | A1 | 3/2015 | Mitra et al. |
| 2015/0097844 | A1 | 4/2015 | Wankhede et al. |
| 2015/0116335 | A1 | 4/2015 | Chen et al. |
| 2015/0220354 | A1 | 8/2015 | Nair |
| 2016/0080484 | A1 | 3/2016 | Earl |
| 2016/0247248 | A1 | 8/2016 | Ha et al. |
| 2016/0335738 | A1 | 11/2016 | Chen et al. |

OTHER PUBLICATIONS

Federico Silla. "The rCUDA technology: an inexpensive way to improve the performance of GPU-based clusters." Talk at Computer Engineering Laboratory, Delft University of Technology. Delft, Netherlands. Apr. 2015, pp. 1-47.
Antonio J. Pena, et al., "A Complete and Efficient CUDA-Sharing Solution for HPC Clusters", Sep. 2, 2014, Retrieved from the Internet: URL: http://www.mcs.anl.gov/papers/P5137-0514.pdf, pp. 1-28.
Nice, "DCV Administration Guide," Nice s.r.l, Asti, Italy, Jul. 2015, Source: https://www.nice-software.com/download/nice-dcv-2014#documentation, pp. 1-96.
U.S. Appl. No. 14/822,511, filed Aug. 10, 2015, Nicholas Patrick Wilt et al.
U.S. Appl. No. 14/938,457, filed Nov. 11, 2015, Nicholas Patrick Wilt et al.
U.S. Appl. No. 14/938,461, filed Nov. 11, 2015, Nicholas Patrick Wilt et al.
U.S. Appl. No. 14/938,656, filed Nov. 11, 2015, Nicholas Patrick Wilt et al.
U.S. Appl. No. 14/938,654, filed Nov. 11, 2015, Nicholas Patrick Wilt et al.
U.S. Appl. No. 15/178,292, filed Jun. 9, 2016, Nicholas Patrick Wilt.
U.S. Appl. No. 15/177,255, filed Jun. 8, 2016, Nicholas Patrick Wilt.
U.S. Appl. No. 15/177,262, filed Jun. 8, 2016, Nicholas Patrick Wilt.
U.S. Appl. No. 15/382,321, filed Dec. 16, 2016, Nicholas Patrick Wilt.
International Search Report and Written Opinion from PCT/US2017/065592, dated Mar. 19, 2018, Amazon Technologies Inc. pp. 1-15.

* cited by examiner

CAPACITY RESERVATION FOR VIRTUALIZED GRAPHICS PROCESSING

This application is a continuation of U.S. patent application Ser. No. 15/376,399, filed Dec. 12, 2016, now U.S. Pat. No. 10,373,284, which is hereby incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

The advent of virtualization technologies for commodity hardware has provided benefits with respect to managing large-scale computing resources for clients with diverse needs. For example, virtualization technologies may allow a single physical computing device to be shared among multiple users by providing each user with one or more virtual machines hosted by the single physical computing device. Each such virtual machine may be a software simulation acting as a distinct logical computing system that provides users with the illusion that they are the sole operators and administrators of a given hardware computing resource, while also providing application isolation and security among the various virtual machines. With virtualization, the single physical computing device can create, maintain, or delete virtual machines in a dynamic manner.

Figure 1:
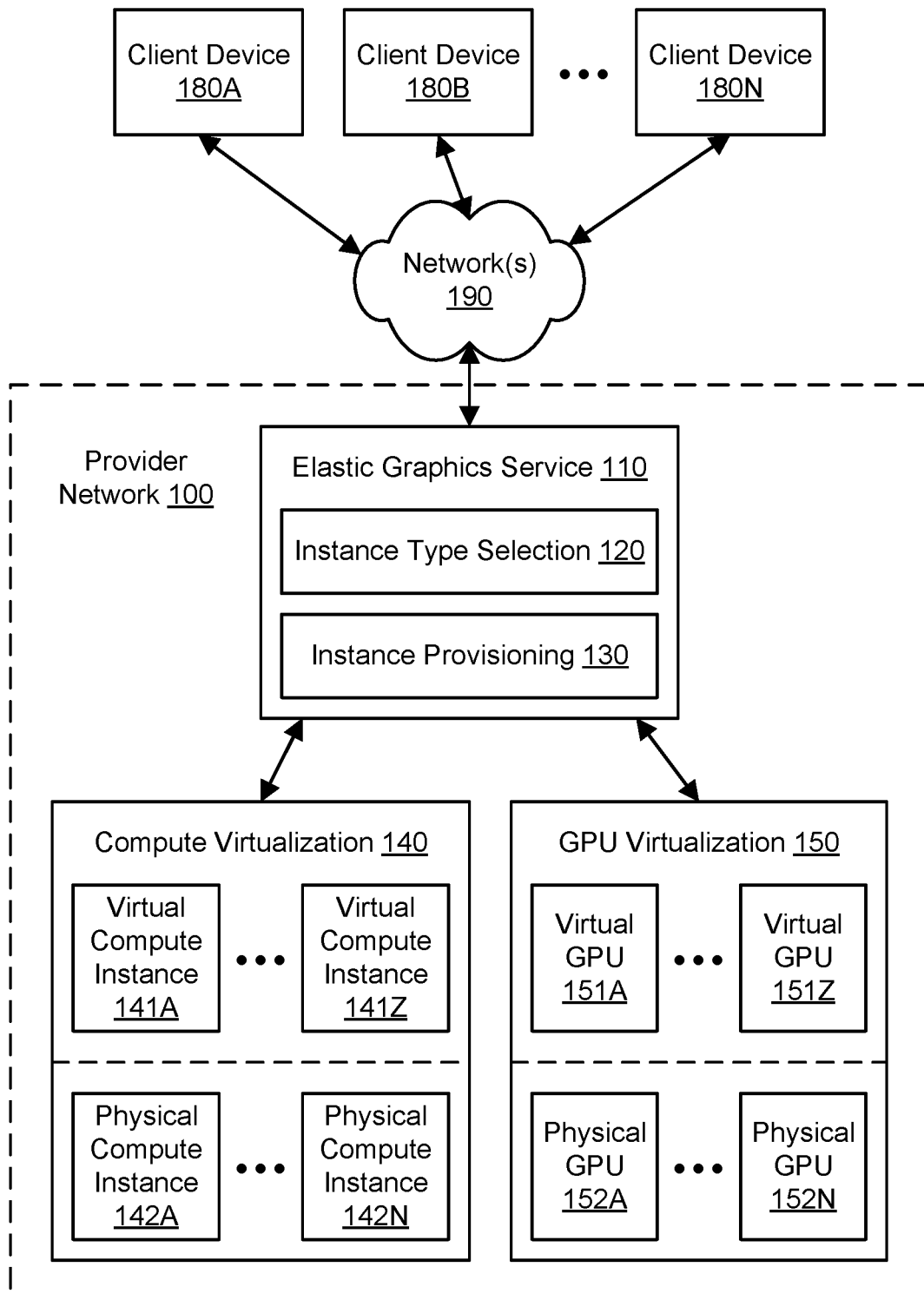
FIG. 1 illustrates an example system environment for virtualizing graphics processing in a provider network, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for capacity reservation for virtualized graphics processing are described. Using the techniques described herein, virtual graphics processing unit (GPU) resources may be reserved for use with virtual compute instances in a manner that reduces contention for a large number of concurrent requests. A request to attach one or more virtual GPUs to one or more virtual compute instances may specify one or more constraints for selection of the virtual GPU(s), such as a virtual GPU type or class for the virtual GPU(s) and/or a location constraint for the virtual GPU(s). A data store may maintain availability information for virtual GPUs in a multi-tenant provider network. The data store may be segmented according to various potential constraints. For example, the data store may include one set of segments for virtual GPUs of one type in one particular region while also including other sets of segments for virtual GPUs of different types and in the same region or a different region. To process a request, one or more data store segments may be used that are specific to the combination of constraints in the request. Within a particular segment, one or more pages or other sets of of availability information may be retrieved from the data store. Attempts to reserve the requested virtual GPU(s) may be made within the availability information (e.g., using a random selection within the page) until the reservation is successful, or otherwise the reservation attempts may be tried for a different page within the same segment or a different segment. Various techniques may be used to reduce contention for concurrent requests, such as segmenting the data store into segments and further into pages, randomly selecting segments, randomly selecting pages within segments, and/or randomly selecting virtual GPUs within pages. A selected and reserved virtual GPU may be attached to a virtual compute instance associated with the client that generated the attachment request. A physical compute instance that implements the virtual compute instance may communicate over a network with a graphics server that includes a physical GPU used to implement the virtual GPU. The virtual compute instance may be configured to execute applications using the virtualized graphics processing provided by the virtual GPU.

Virtualized Graphics Processing in a Provider Network

FIG. 1 illustrates an example system environment for virtualizing graphics processing in a provider network, according to one embodiment. Clients of a provider network 100 may use computing devices such as client devices 180A-180N to access an elastic graphics service 110 and other resources offered by the provider network. The client devices 180A-180N may be coupled to the provider network 100 via one or more networks 190. The provider network 100 may provide compute virtualization 140 such that a plurality of virtual compute instances 141A-141Z may be implemented using a plurality of physical compute instances 142A-142N. The virtual compute instances 141A-141Z may also be referred to herein as virtual machines (VMs). Similarly, the provider network 100 may provide GPU virtualization 150 such that a plurality of virtual GPUs 151A-151Z may be implemented using a plurality of physical GPUs 152A-152N. An example hardware architecture for implementing virtual GPUs using physical GPUs is discussed with reference to FIG. 5. The underlying physical compute instances 142A-142N may be heterogeneous, and the underlying physical GPUs 152A-152N may be heterogeneous as well. In one embodiment, the compute virtualization 140 may use techniques for multi-tenancy to provision virtual compute instances 141A-141Z that exceed the physical compute instances 142A-142N in number. In one embodiment, the GPU virtualization 150 may use techniques for multi-tenancy to provision virtual GPUs 151A-151Z that exceed the physical GPUs 152A-152N in number.

The elastic graphics service 110 may offer, to clients, selection and provisioning of virtualized compute instances with attached virtualized GPUs. Accordingly, the elastic graphics service 110 may include an instance type selection functionality 120 and an instance provisioning functionality 130. In one embodiment, the provider network 100 may offer virtual compute instances 141A-141Z with varying computational and/or memory resources. In one embodiment, each of the virtual compute instances 141A-141Z may correspond to one of several instance types. An instance type may be characterized by its computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using the instance type selection functionality 120, an instance type may be selected for a client, e.g., based (at least in part) on input from the client. For example, a client may choose an instance type from a predefined set of instance types. As another example, a client may specify the desired resources of an instance type, and the instance type selection functionality 120 may select an instance type based on such a specification.

In one embodiment, the provider network 100 may offer virtual GPUs 151A-151Z with varying graphics processing capabilities. In one embodiment, each of the virtual GPUs 151A-151Z may correspond to one of several virtual GPU classes. A virtual GPU class may be characterized by its computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on. Using the instance type selection functionality 120, a virtual GPU class may be selected for a client, e.g., based (at least in part) on input from the client. For example, a client may choose a virtual GPU class from a predefined set of virtual GPU classes. As another example, a client may specify the desired resources of a virtual GPU class, and the instance type selection functionality 120 may select a virtual GPU class based on such a specification.

Therefore, using the instance type selection functionality 120, clients (e.g., using client devices 180A-180N) may specify requirements for virtual compute instances and virtual GPUs. The instance provisioning functionality 130 may provision virtual compute instances with attached virtual GPUs based on the specified requirements (including any specified instance types and virtual GPU classes). As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client. For a particular client, a virtual compute instance may be provisioned of the instance type selected by or for the client, and the virtual compute instance may be provisioned with an attached virtual GPU of the GPU class selected by or for the client. In one embodiment, a virtual GPU of substantially any virtual GPU class may be attached to a virtual compute instance of substantially any instance type.

The provider network 100 may be set up by an entity such as a company or a public sector organization to provide one or more services (such as various types of cloud-based computing or storage) accessible via the Internet and/or other networks to client devices 180A-180N. Provider network 100 may include numerous data centers hosting various resource pools, such as collections of physical and/or virtualized computer servers, storage devices, networking equipment and the like (e.g., implemented using computing system 3000 described below with regard to FIG. 14), needed to implement and distribute the infrastructure and services offered by the provider network 100. In some embodiments, provider network 100 may provide computing resources, such as compute virtualization service 140 and GPU virtualization service 150; storage services, such as a block-based storage service, key-value based data stores, or various types of database systems; and/or any other type of network-based services. Client devices 180A-180N may access these various services offered by provider network 100 via network(s) 190. Likewise, network-based services may themselves communicate and/or make use of one another to provide different services. For example, computing resources offered to client devices 180A-180N in units called "instances," such as virtual or physical compute instances or storage instances, may make use of particular data volumes, providing virtual block storage for the compute instances. The provider network 100 may implement or provide a multi-tenant environment such that multiple clients (e.g., using client devices 180A-180N) may access or use a particular resource in a substantially simultaneous manner.

As noted above, compute virtualization service 140 may offer various virtual compute instances 141A-141Z to client devices 180A-180N. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of the compute virtualization service 140 in different embodiments, including general purpose or special purpose computer servers, storage devices, network devices and the like. In some embodiments, client devices 180A-180N or other any other user may be configured (and/or authorized) to direct network traffic to a virtual compute instance. In various embodiments, virtual compute instances 141A-141Z may attach or map to one or more data volumes provided by a storage service in order to obtain persistent storage for performing various operations. Using the techniques described herein, virtual GPUs 151A-151Z may be attached to virtual compute instances 141A-141Z to provide graphics processing for the virtual compute instances.

Virtual compute instances 141A-141Z may operate or implement a variety of different platforms, such as application server instances, Java™ virtual machines (JVMs) or other virtual machines, general purpose or special-purpose operating systems, platforms that support various interpreted or compiled programming languages such as Ruby, Perl, Python, C, C++ and the like, or high-performance computing platforms) suitable for performing client applications, without for example requiring the client devices 180A-180N to access an instance. In some embodiments, virtual compute instances 141A-141Z may have different instance types or configurations based on expected uptime ratios. The uptime ratio of a particular virtual compute instance may be defined as the ratio of the amount of time the instance is activated to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and the client may pay a discounted hourly usage fee in accordance with the associated pricing policy. If the client expects to have a steady-state workload that requires an instance to be up most of the time, then the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Virtual compute instance configurations may also include virtual compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). In some embodiments, particular instance types for virtual compute instances may be associated with default classes for virtual GPUs. For example, some instance types may be configured without a virtual GPU as a default configuration, while other instance types designated for graphics intensive workloads may be designated with particular virtual GPU classes as a default configuration. Configurations of virtual compute instances may also include their location in a particular data center or availability zone, geographic location, and (in the case of reserved compute instances) reservation term length.

The client devices 180A-180N may represent or correspond to various clients or users of the provider network 100, such as customers who seek to use services offered by the provider network. The clients, users, or customers may represent persons, businesses, other organizations, and/or other entities. The client devices 180A-180N may be distributed over any suitable locations or regions. Each of the client devices 180A-180N may be implemented using one or more computing devices, any of which may be implemented by the example computing device 3000 illustrated in FIG. 14.

The client devices 180A-180N may encompass any type of client configurable to submit requests to provider network 100. For example, a given client device may include a suitable version of a web browser, or it may include a plug-in module or other type of code module configured to execute as an extension to or within an execution environment provided by a web browser. Alternatively, a client device may encompass an application such as a database application (or user interface thereof), a media application, an office application, or any other application that may make use of virtual compute instances, storage volumes, or other network-based services in provider network 100 to perform various operations. In some embodiments, such an application may include sufficient protocol support (e.g., for a suitable version of Hypertext Transfer Protocol [HTTP]) for generating and processing network-based service requests without necessarily implementing full browser support for all types of network-based data. In some embodiments, client devices 180A-180N may be configured to generate network-based service requests according to a Representational State Transfer (REST)-style network-based services architecture, a document- or message-based network-based services architecture, or another suitable network-based services architecture. In some embodiments, client devices 180A-180N (e.g., a computational client) may be configured to provide access to a virtual compute instance in a manner that is transparent to applications implement on the client device utilizing computational resources provided by the virtual compute instance. In at least some embodiments, client devices 180A-180N may provision, mount, and configure storage volumes implemented at storage services for file systems implemented at the client devices.

Client devices 180A-180N may convey network-based service requests to provider network 100 via external network(s) 190. In various embodiments, external network(s) 190 may encompass any suitable combination of networking hardware and protocols necessary to establish network-based communications between client devices 180A-180N and provider network 100. For example, the network(s) 190 may generally encompass the various telecommunications networks and service providers that collectively implement the Internet. The network(s) 190 may also include private networks such as local area networks (LANs) or wide area networks (WANs) as well as public or private wireless networks. For example, both a given client device and the provider network 100 may be respectively provisioned within enterprises having their own internal networks. In such an embodiment, the network(s) 190 may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the provider network 100. It is noted that in some embodiments, client devices 180A-180N may communicate with provider network 100 using a private network rather than the public Internet.

Figure 14:
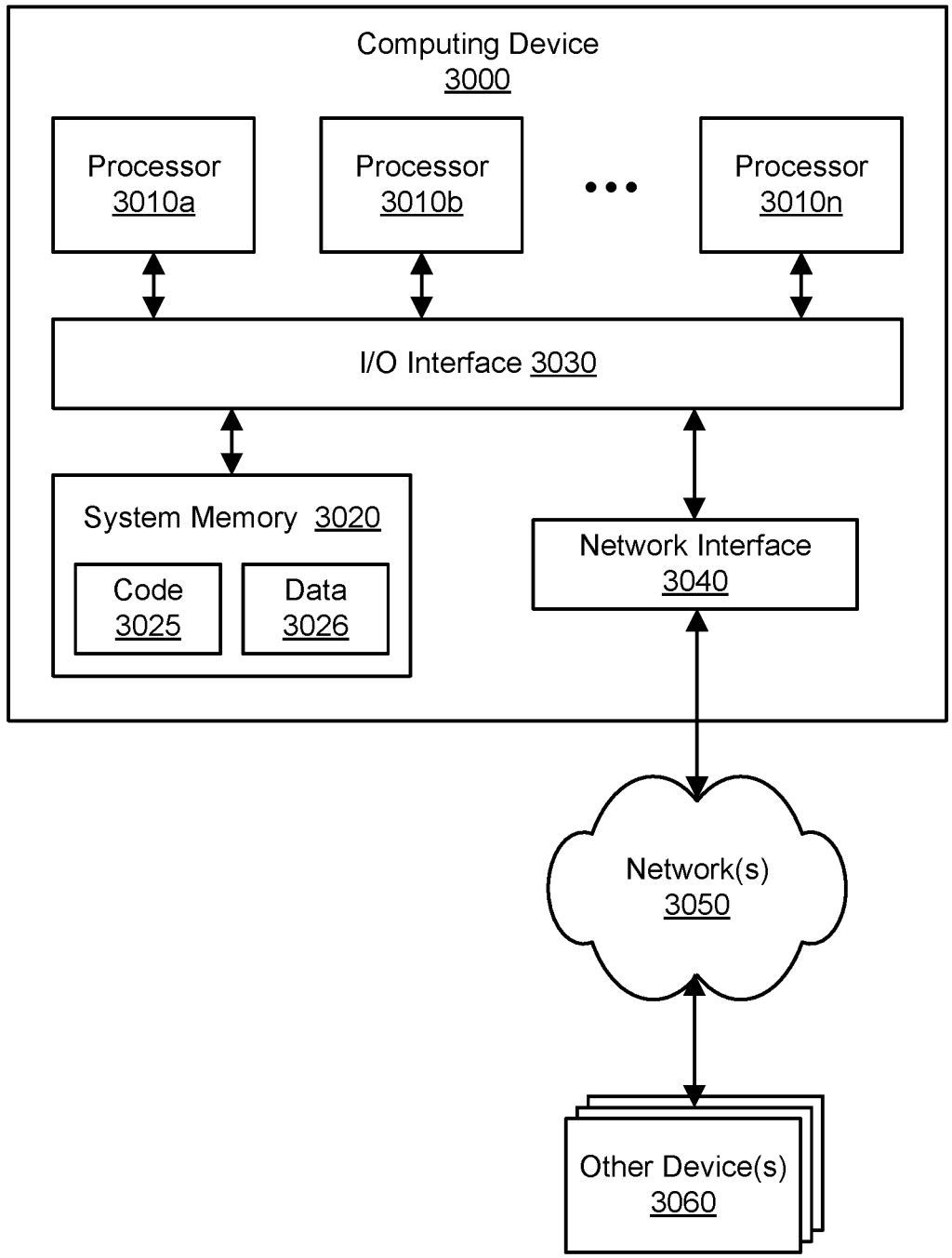
FIG. 14 illustrates an example computing device that may be used in some embodiments.

The provider network 100 may include a plurality of computing devices, any of which may be implemented by the example computing device 3000 illustrated in FIG. 14. In various embodiments, portions of the described functionality of the provider network 100 may be provided by the same computing device or by any suitable number of different computing devices. If any of the components of the provider network 100 are implemented using different computing devices, then the components and their respective computing devices may be communicatively coupled, e.g., via a network. Each of the illustrated components (such as the elastic graphics service 110 and its constituent functionalities 120 and 130) may represent any combination of software and hardware usable to perform their respective functions.

It is contemplated that the provider network 100 may include additional components not shown, fewer components than shown, or different combinations, configurations, or quantities of the components shown. For example, although physical compute instances 142A through 142N are shown for purposes of example and illustration, it is contemplated that different quantities and configurations of physical compute instances may be used. Similarly, although physical GPUs 152A through 152N are shown for purposes of example and illustration, it is contemplated that different quantities and configurations of physical GPUs may be used. Additionally, although three client devices 180A, 180B, and 180N are shown for purposes of example and illustration, it is contemplated that different quantities and configurations of client devices may be used. Aspects of the functionality described herein for providing virtualized graphics processing may be performed, at least in part, by components outside of the provider network 100.

Figure 2A:
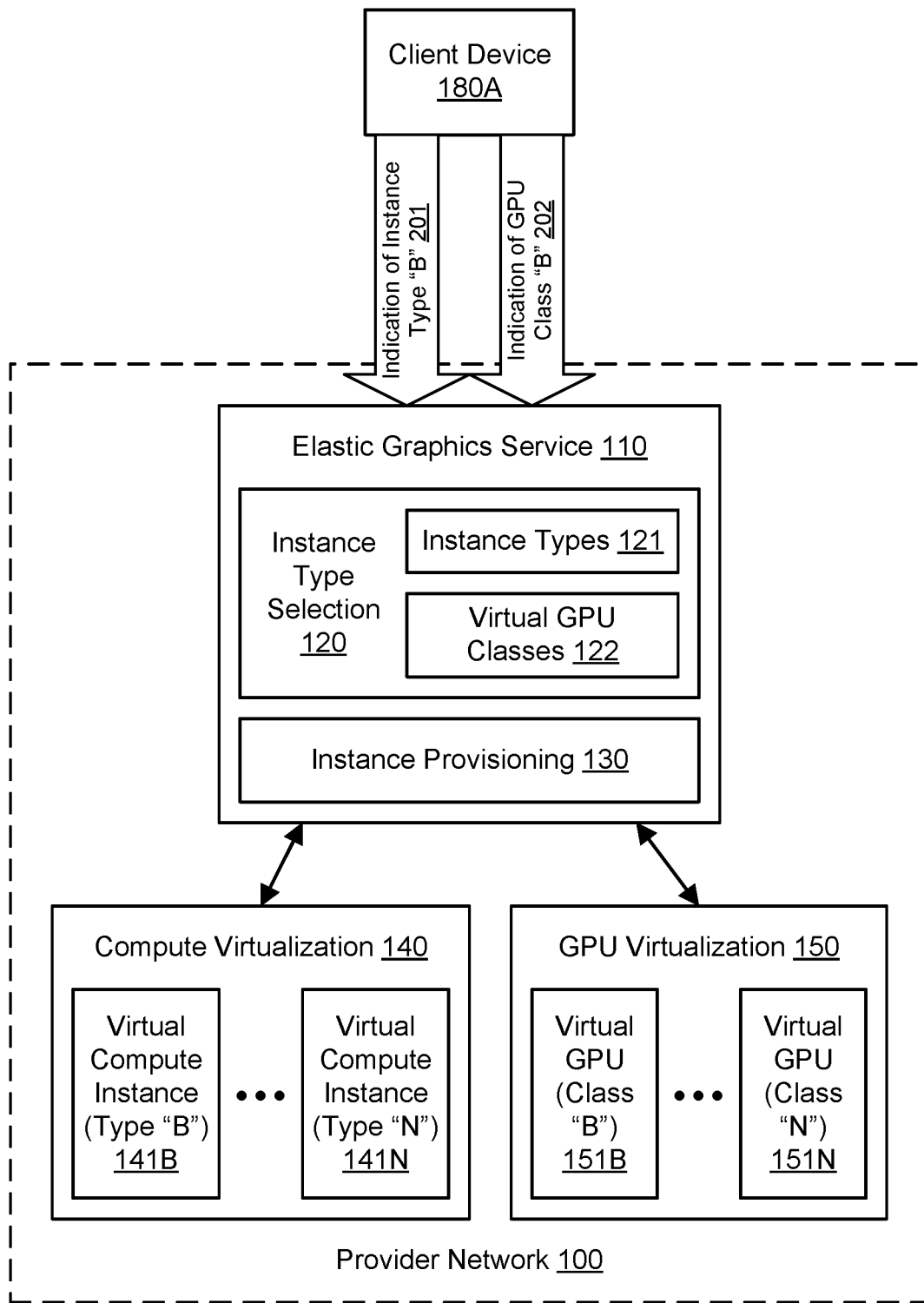
FIG. 2A illustrates further aspects of the example system environment for virtualizing graphics processing in a provider network, including selection of an instance type and virtual GPU class for a virtual compute instance with an attached virtual GPU, according to one embodiment.

FIG. 2A illustrates further aspects of the example system environment for virtualizing graphics processing in a provider network, including selection of an instance type and virtual GPU class for a virtual compute instance with an attached virtual GPU, according to one embodiment. As discussed above, the provider network 100 may offer to the client device 180A a plurality of instance types 121 for virtual compute instances. As shown for purposes of illustration and example, virtual compute instances of type "B" 141B through type "N" 141N may be offered. However, it is contemplated that any suitable number and configuration of virtual compute instance types may be offered to clients by the provider network 100. An instance type may be characterized by its computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using the instance type selection functionality 120, the client device 180A may provide an indication, specification, or other selection 201 of a particular instance type. For example, a client may choose or the instance type "B" from a predefined set of instance types using input 201. As another example, a client may specify the desired resources of an instance type using input 201, and the instance type selection functionality 120 may select the instance type "B" based on such a specification. Accordingly, the virtual compute instance type may be selected by the client or on behalf of the client, e.g., using the instance type selection functionality 120.

As discussed above, the provider network 100 may offer to the client device 180A a plurality of virtual GPU classes 122 for virtual GPUs. As shown for purposes of illustration and example, virtual GPUs of class "B" 151B through class "N" 151N may be offered. However, it is contemplated that any suitable number and configuration of virtual GPU classes may be offered to clients by the provider network 100. A virtual GPU class may be characterized by its computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on. Using the instance type selection functionality 120, the client device 180A may provide an indication, specification, or other selection 202 of a particular virtual GPU class. For example, a client may choose the virtual GPU class "B" from a predefined set of virtual GPU classes using input 202. As another example, a client may specify the desired resources of a virtual GPU class using input 202, and the instance type selection functionality 120 may select the virtual GPU class "B" based on such a specification. Accordingly, the virtual GPU class may be selected by the client or on behalf of the client, e.g., using the instance type selection functionality 120.

Figure 2B:
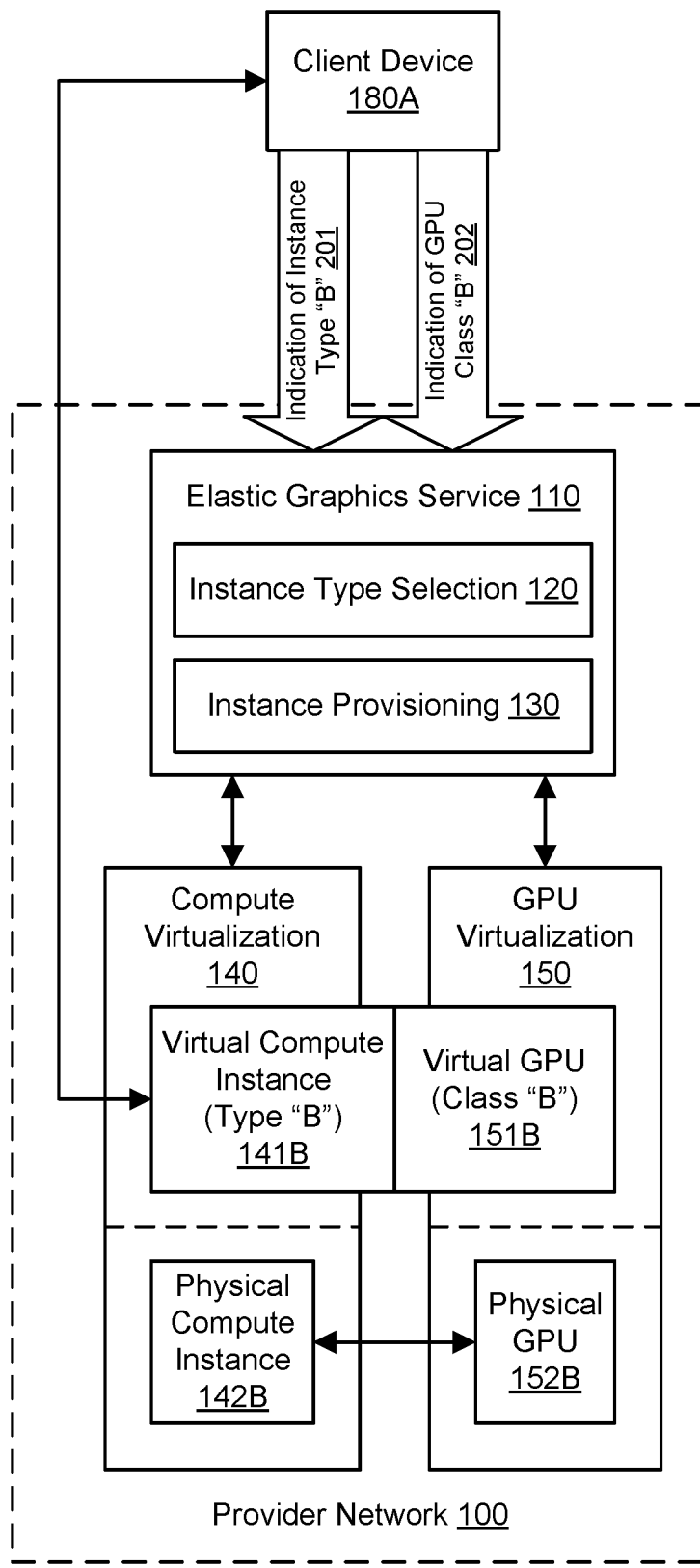
FIG. 2B illustrates further aspects of the example system environment for virtualizing graphics processing in a provider network, including provisioning of a virtual compute instance with an attached virtual GPU, according to one embodiment.

FIG. 2B illustrates further aspects of the example system environment for virtualizing graphics processing in a provider network, including provisioning of a virtual compute instance with an attached virtual GPU, according to one embodiment. The instance provisioning functionality 130 may provision a virtual compute instance 141B with an attached virtual GPU 151B based on the specified instance type "B" and the specified virtual GPU class "B". The provisioned virtual compute instance 141B may be implemented by the compute virtualization functionality 140 using suitable physical resources such as a physical compute instance 142B, and the provisioned virtual GPU 151B may be implemented by the GPU virtualization functionality 150 using suitable physical resources such as a physical GPU 152B. As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client. In one embodiment, a virtual GPU of substantially any virtual GPU class may be attached to a virtual compute instance of substantially any instance type. To implement the virtual compute instance 141B with the attached virtual GPU 151B, a physical compute instance 142B may communicate with a physical GPU 152B, e.g., over a network. The physical GPU 152B may be located in a different computing device than the physical compute instance 142B. Even though they may be implemented using separate hardware, the virtual GPU 151B may be said to be attached to the virtual compute instance 141B, or the virtual compute instance may be said to include the virtual GPU. The virtual GPU 151B may be installed on a device that may reside in various locations relative to the physical GPU 152B, e.g., on the same rack, the same switch, the same room, and/or other suitable locations on the same network. A vendor of the physical GPU 152B may be hidden from the client device 180A.

Figure 3:
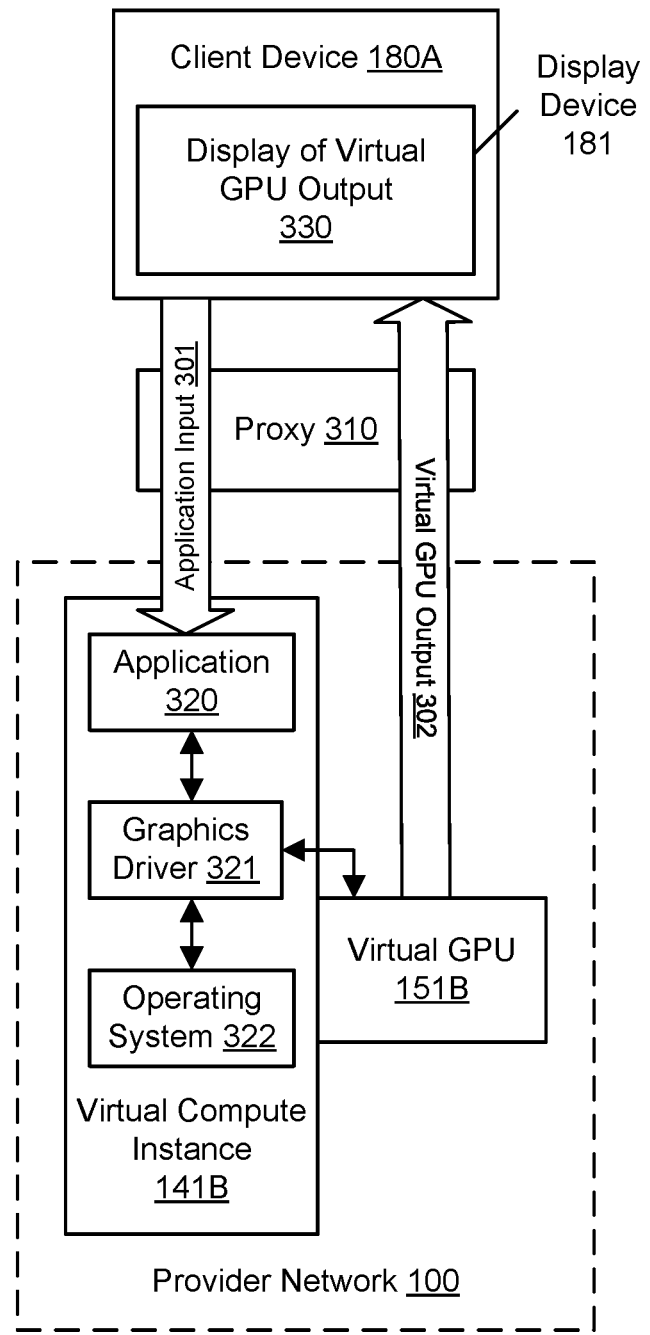
FIG. 3 illustrates the use of a virtual compute instance with a virtual GPU to generate virtual GPU output for display on a client device, according to one embodiment.

FIG. 3 illustrates the use of a virtual compute instance with a virtual GPU to generate virtual GPU output for display on a client device, according to one embodiment. After the virtual compute instance 141B is provisioned with the attached virtual GPU 151B, the client device 180A may use the provisioned instance and virtual GPU to perform any suitable tasks, e.g., based on input from the client device. The virtual compute instance 141B may execute a particular application 320. The application 320 may be selected or provided by the client. The virtual compute instance 141B may also be configured with a particular operating system 322 that provides support for the application 321. Additionally, the virtual compute instance 141B may be configured with a particular graphics driver 321. The graphics driver 321 may interact with the virtual GPU 151B to provide graphics processing for the application 320, including accelerated two-dimensional graphics processing and/or accelerated three-dimensional graphics processing. In one embodiment, the graphics driver 321 may implement a graphics application programming interface (API) such as Direct3D or OpenGL. The graphics driver 321 may represent components running in user mode and/or kernel mode. Additional components (not shown), such as a graphics runtime, may also be used to provide accelerated graphics processing on the virtual compute instance 141B.

The client device 180A may communicate with the virtual compute instance 141B through a proxy 310. Various other communications may be sent through the proxy 310, including for example virtual GPU output 302 from the virtual GPU 151B to the client device 180A. Use of the proxy 310 may hide the address of the virtual compute instance and any associated resources (including a computing device that implements the virtual GPU 151B) from the client device 180A. The proxy 310 and virtual compute instance 141B may communicate using a suitable remoting protocol. In various embodiments, the proxy 310 may or may not be part of the provider network 100. The client device 180A may provide application input 301 to the application 320 running on the virtual compute instance 141B. For example, the application input 301 may include data to be operated upon by the application 320 and/or instructions to control the execution of the application.

Using the graphics processing provided by the virtual GPU 151B, execution of the application may generate virtual GPU output 302. The virtual GPU output 302 may be provided to the client device 180A, e.g., from the virtual GPU 151B or virtual compute instance 141B. In one embodiment, the virtual GPU output 302 may be sent from the virtual GPU 151B (e.g., from a computing device that includes the virtual GPU) to the client device 180A while bypassing the rest of the virtual compute instance 141B (e.g., the underlying physical compute instance 142B). The virtual GPU output 302 may also be sent to the client device 180A through the proxy 310. The proxy 310 and virtual GPU 151B may communicate using a suitable remoting protocol. In one embodiment, the virtual GPU output 302 may be returned to the virtual compute instance 141B, and the virtual compute instance may send the virtual GPU output to the client device 180A. In one embodiment, the client device 180A may forward the virtual GPU output 302 to another component.

In one embodiment, a display device 181 associated with the client device 180A may present a display 330 of the virtual GPU output 302. In one embodiment, the virtual GPU output 302 may include pixel data, image data, video data, or other graphical data. In one embodiment, the virtual GPU output 302 may drive a full-screen display on the display device 181. Portions of the virtual GPU output 302 may be streamed to the client device 180A over time. In one embodiment, the virtual GPU output 302 may be composited with one or more other sources of graphical data to produce the display 330. In one embodiment, the virtual GPU 151B may be used for general-purpose computing (e.g., GPGPU computing), and the virtual GPU output 302 may not include pixel data or other graphical data. In various embodiments, the client device 180A may process or transform all or part of the virtual GPU output 302 before displaying the output. For example, a CPU, GPU, or co-processor on the client device 180A may transform portions of the virtual GPU output 302 and display the results on the display device 181.

In various embodiments, any suitable technique(s) may be used to offload graphics processing from a virtual compute instance to a physical GPU. In one embodiment, an API shim may intercept calls to a graphics API and marshal the calls over a network to an external computing device that includes a physical GPU. In one embodiment, a driver shim may surface a proprietary driver to the virtual compute instance, intercept calls, and marshal the calls over a network to an external computing device that includes a physical GPU. In one embodiment, a hardware shim may surface a hardware interface to the virtual compute instance and marshal attempts by the instance to interact with the physical GPU.

Figure 4:
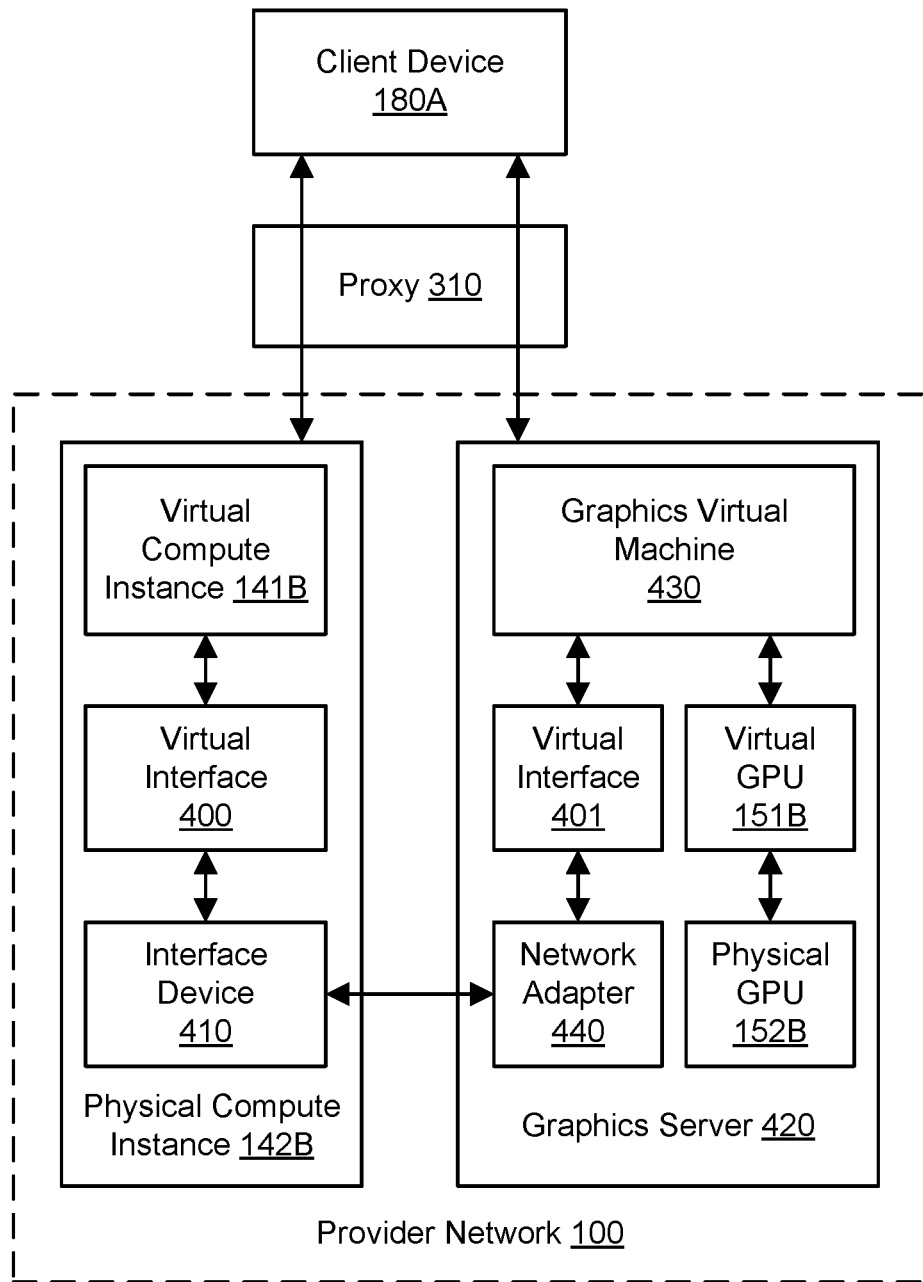
FIG. 4 illustrates an example hardware architecture for implementing virtualized graphics processing, according to one embodiment.

FIG. 4 illustrates an example hardware architecture for implementing virtualized graphics processing, according to one embodiment. In one embodiment, the virtual compute instance 141B may be implemented using a physical compute instance 142B, and the virtual GPU 151B attached to that instance 141B may be implemented using a separate and distinct computing device termed a graphics server 420. The virtual compute instance 141B may use a virtual interface 400 to interact with an interface device 410. The virtual interface 400 may enable the virtual compute instance 141B to send and receive network data. The interface device 410 may include a network interface and a custom hardware interface. Via the custom hardware interface, the interface device 410 may run program code to emulate a GPU interface and appear to the virtual compute instance 141B to implement or include the virtual GPU 151B. In one embodiment, the interface device 410 may present a graphics API to the virtual compute instance 141B and receive API calls for graphics processing (e.g., accelerated 3D graphics processing). Via the network interface, the interface device 410 may communicate with the graphics server 420 (and thus with the physical GPU 152B) over a network. The interface device 410 may be implemented in any suitable manner, e.g., as an expansion card (such as a PCI Express card) or attached peripheral device for the physical compute instance 142B. The interface device 410 may use single root I/O virtualization to expose hardware virtual functions to the virtual compute instance 141B. In one embodiment, the physical compute instance 142B may implement a plurality of virtual compute instances, each with its own virtual interface, and the virtual compute instances may use the interface device 410 to interact with the corresponding virtual GPUs on one or more graphics servers. The physical compute instance 142B may communicate with the proxy 310 using a suitable remoting protocol, e.g., to send data to and receive data from the client device 180A.

Graphics offload performed by the interface device 410 (e.g., by executing custom program code on the interface device) may translate graphics API commands into network traffic (encapsulating the graphics API commands) that is transmitted to the graphics server 420, and the graphics server 420 may execute the commands on behalf of the interface device. The graphics server 420 may include a network adapter 440 that communicates with the interface device 410 (e.g., with the network interface of the interface device) over a network. In one embodiment, the interface device 410 may receive calls to a graphics API (using the custom hardware interface) and generate graphics offload traffic to be sent to the network adapter 440 (using the network interface). The graphics server 410 may implement a graphics virtual machine 430. Any suitable technologies for virtualization may be used to implement the graphics virtual machine 430. In one embodiment, the graphics virtual machine 430 may represent a generic virtual machine that is GPU-capable and is dedicated to providing accelerated graphics processing using one or more virtual GPUs. The graphics virtual machine 430 may be coupled to the network adapter 440 using a virtual interface 401. The virtual interface 401 may enable the graphics virtual machine 430 to send and receive network data. The graphics virtual machine 430 may implement the virtual GPU 151B using the graphics processing capabilities of the physical GPU 152B. In one embodiment, the physical GPU 152B can be accessed directly by the graphics virtual machine 430, and the physical GPU 152B can use direct memory access to write to and read from memory managed by the graphics virtual machine. In one embodiment, the graphics server 420 may implement a plurality of virtual GPUs (such as virtual GPU 151B) using one or more physical GPUs (such as physical GPU 152B), and the virtual GPUs may interact with the corresponding virtual compute instances on one or more physical compute instances over a network. The graphics server 420 may communicate with the proxy 310 using a suitable remoting protocol, e.g., to send data to and receive data from the client device 180A. For example, the graphics server 420 may generate virtual GPU output based on the commands sent from the interface device 410. The virtual GPU output may be provided to the client device 180A through the proxy 310, e.g., from the physical compute instance 142B or graphics server 420.

Figure 5:
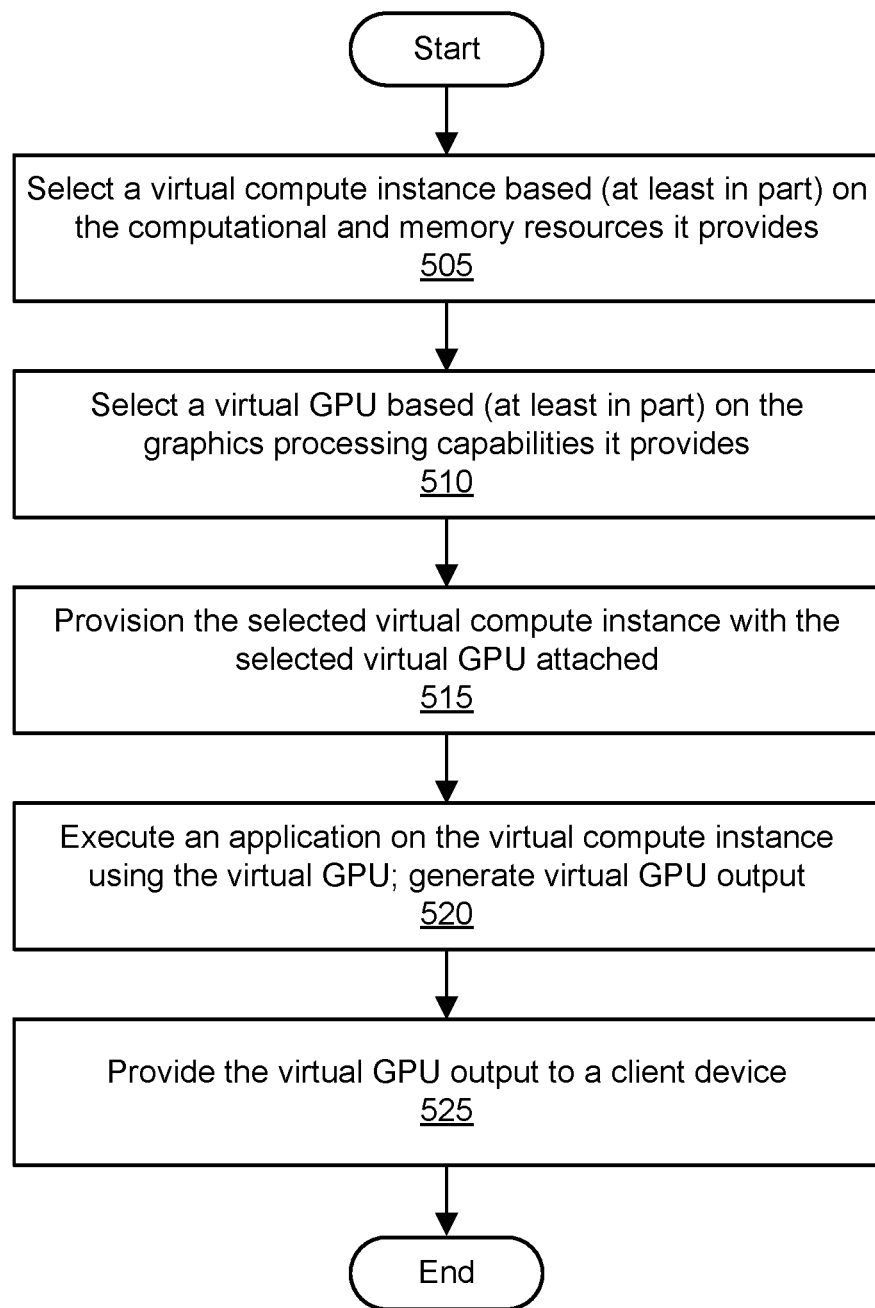
FIG. 5 is a flowchart illustrating a method for virtualizing graphics processing in a provider network, according to one embodiment.

FIG. 5 is a flowchart illustrating a method for virtualizing graphics processing in a provider network, according to one embodiment. As shown in 505, a virtual compute instance may be selected. The virtual compute instance may be selected based (at least in part) on computational and memory resources provided by the virtual compute instance. For example, the virtual compute instance may be selected based (at least in part) on a selection of an instance type by a user. As shown in 510, a virtual GPU may be selected. The virtual GPU may be selected based (at least in part) on graphics processing capabilities provided by the virtual GPU. For example, the virtual GPU may be selected based (at least in part) on a selection of a virtual GPU class by a user. The virtual compute instance and virtual GPU may also be selected based (at least in part) on availability of resources in a resource pool of a provider network that manages such resources. In one embodiment, an elastic graphics service may receive the specifications for and/or selections of the virtual compute instance and virtual GPU.

As shown in 515, the selected virtual compute instance may be provisioned with the selected virtual GPU attached. In one embodiment, the elastic graphics service may interact with one or more other services or functionalities of a provider network, such as a compute virtualization functionality and/or GPU virtualization functionality, to provision the instance with the virtual GPU. The virtual compute instance may be implemented using central processing unit (CPU) resources and memory resources of a physical compute instance. The virtual GPU may be implemented using a physical GPU. The physical GPU may be attached to a different computing device than the computing device that provides the CPU resources for the virtual compute instance. The physical GPU may be accessible to the physical compute instance over a network. The virtual GPU may be said to be attached to the virtual compute instance, or the virtual compute instance may be said to include the virtual GPU. In one embodiment, the physical GPU may be shared between the virtual GPU and one or more additional virtual GPUs, and the additional virtual GPUs may be attached to additional virtual compute instances. In one embodiment, the virtual GPU may be accessible to the virtual compute instance via an interface device that includes a network interface and a custom hardware interface. Via the custom hardware interface, the interface device may emulate a GPU and appear to the virtual compute instance to include the virtual GPU. Via the network interface, the interface device may communicate with the physical GPU over the network.

As shown in 520, an application may be executed on the virtual compute instance using the virtual GPU. Execution of the application may include execution of instructions on the virtual compute instance (e.g., on the underlying physical compute instance) and/or virtual GPU (e.g., on the underlying physical GPU). Execution of the application using the virtual GPU may generate virtual GPU output, e.g., output produced by executing instructions or otherwise performing tasks on the virtual GPU. As shown in 525, the virtual GPU output may be provided to a client device. The virtual GPU output may be provided to the client device from the virtual compute instance or virtual GPU. In one embodiment, the virtual GPU output may be displayed on a display device associated with the client device. The virtual GPU output may include pixel information or other graphical data that is displayed on the display device. Execution of the application using the virtual GPU may include graphics processing (e.g., acceleration of three-dimensional graphics processing) for the application using a graphics API.

In some embodiments, scaling techniques may be used with the techniques for virtualized graphics processing described herein. A virtual compute instance may be provisioned, and a first set of one or more GPU(s) may be attached to the instance to provide graphics processing. The first set of one or more virtual GPUs may provide a particular level of graphics processing. After a change in GPU requirements for the instance is determined, the second set of one or more virtual GPU(s) may be selected and attached to the virtual compute instance to replace the graphics processing of the first virtual GPU(s) with a different level of graphics processing. The second virtual GPU(s) may be selected based on the change in GPU requirements. Depending upon the change in GPU requirements, such a scaling operation may migrate graphics processing for a virtual compute instance from a less capable or smaller virtual GPU class to a more capable or larger virtual GPU class or from a more capable or larger virtual GPU class to a less capable or smaller virtual GPU class. In one embodiment, the migration of graphics processing may be performed based (at least in part) on user input representing a change in GPU requirements. In one embodiment, the migration of graphics processing may be performed based (at least in part) on detection of an increase in graphics workload. Live migration may be performed while applications are being executed using the first virtual GPU(s) in a manner that does not require changing or relaunching the applications. Migration of the virtual compute instance to a different physical compute instance may also be performed, e.g., to reduce network latency associated with virtualized graphics processing.

In some embodiments, placement optimization techniques may be used with the techniques for virtualized graphics processing described herein. Optimization of resource placement may improve one or more metrics (e.g., related to resource usage or cost) for GPU virtualization. Physical compute instance(s) may be used to implement virtual compute instance(s), and physical GPU(s) may be used to implement virtual GPU(s) attached to the virtual compute instance(s). Using techniques for placement optimization, locations of the virtual compute instance(s) and/or virtual GPU(s) may be selected in the provider network (from among a set of available physical compute instance(s) and/or physical GPU(s)) based on any suitable placement criteria. The one or more placement criteria may be based (at least in part) on metrics associated with maximizing performance, minimizing cost, minimizing energy usage, and/or any other suitable metrics. The placement criteria may also be associated with network locality. For example, to minimize network latency and/or network usage, a virtual compute instance and attached virtual GPU may be placed in the same rack in the same data center such that network communication between the underlying physical compute instance and physical GPU may not extend beyond a top-of-rack switch or other networking component in the rack. If locations within the same rack are not available, then nearby locations within the same data center may be selected for a virtual compute instance and attached virtual GPU. Placement may be optimized in this manner not only for newly provisioned resources but also for migration of a virtual compute instance and/or attached virtual GPU after their use has begun. When scaling is performed for GPU virtualization as discussed above, the locations of any virtual GPUs may be selected based on placement criteria, and/or the location of the virtual compute instance may be moved based on placement criteria.

In some embodiments, application-specific techniques may be used with the techniques for virtualized graphics processing described herein. A virtual compute instance may be provisioned and may be configured to execute an application. The application may be associated with graphics requirements. For example, an application manifest may specify a recommended graphics processing unit (GPU) class and/or size of video memory for the application, or analysis of execution of the application may determine graphics requirements for the application. A virtual GPU may be selected for the virtual compute instance based (at least in part) on the graphics requirements for the application. The virtual GPU may be selected from a set of virtual GPUs (e.g., belonging to virtual GPU classes) having different capabilities for graphics processing. The virtual GPU may be implemented using a physical GPU that is connected to the virtual compute instance over a network. The application may be executed on the virtual compute instance using the virtual GPU. Additional applications on the virtual compute instance may use different application-specific virtual GPUs, and the application-specific virtual GPUs may vary in graphics processing capabilities based on the varying requirements of the applications.

In some embodiments, local-to-remote migration techniques may be used with the techniques for virtualized graphics processing described herein. A virtual compute instance may be provisioned with a local graphics processing unit (GPU) to provide graphics processing. The local GPU may be implemented using attached hardware or using emulation. Because the local GPU may provide only a low level of graphics processing capability, a virtual GPU may be attached to the virtual compute instance to provide improved graphics processing relative to the local GPU. The virtual GPU may be selected from a set of virtual GPUs (e.g., belonging to virtual GPU classes) having different capabilities for graphics processing. The virtual GPU may be implemented using a physical GPU that is connected to the virtual compute instance over a network. Graphics processing for the virtual compute instance may be migrated from the local GPU to the virtual GPU. In one embodiment, graphics processing for a particular application on the virtual compute instance may be migrated from the local GPU to the virtual GPU during execution of the application. In one embodiment, the migration of graphics processing may be performed based (at least in part) on detection of an increase in graphics workload.

Capacity Reservation

Figure 6:
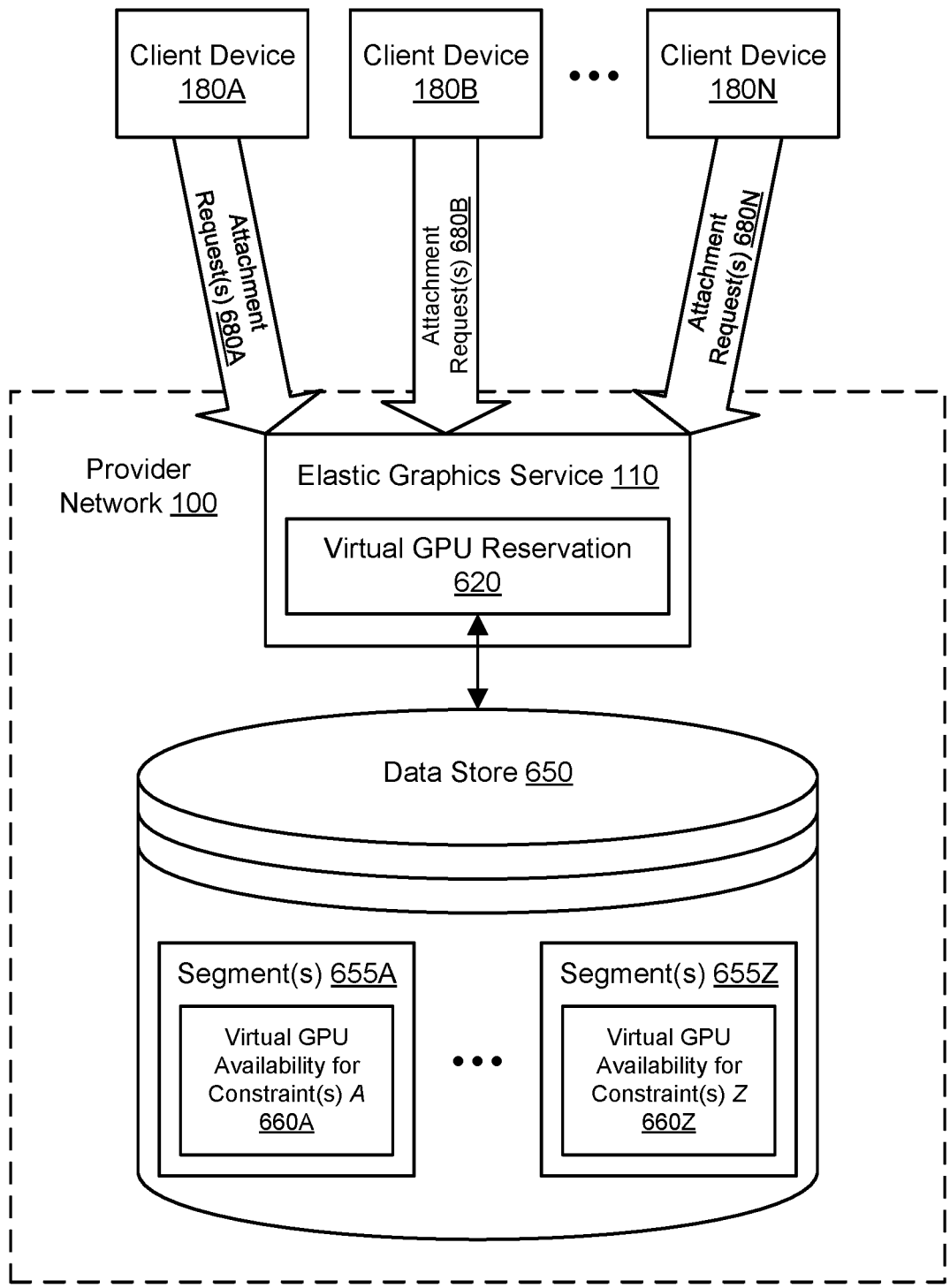
FIG. 6 illustrates an example system environment for capacity reservation for virtualized graphics processing, according to one embodiment.

FIG. 6 illustrates an example system environment for capacity reservation for virtualized graphics processing, according to one embodiment. As discussed above, a provider network 100 may include an elastic graphics service 110 that provides concurrent access to virtual GPU resources for clients such as clients 180A-180N. In one embodiment, the elastic graphics service 110 may include a virtual GPU reservation component 620. Using the virtual GPU reservation component 620, virtual GPU resources may be reserved for use with virtual compute instances in a manner that reduces contention for availability data while processing a large number of concurrent requests.

The clients 180A-180N may send attachment requests to the elastic graphics service 110. As shown in the example of FIG. 6, client 180A may send one or more attachment requests 680A, client 180B may send one or more attachment requests 680B, and client 180N may send one or more attachment requests 680N. At least some of the requests 680A-680N may be received by the service 110 over a relatively small window of time, such that the requests may be considered concurrent. In one embodiment, one of the requests 680A-680N may represent a request to attach one or more virtual GPUs to one or more virtual compute instances to provide network-accessible GPU processing as discussed above with respect to FIG. 1 through FIG. 5. An attachment request may be associated with an existing virtual compute instance that is already provisioned and launched (potentially without a virtual GPU or with a different virtual GPU than indicated in the request) or a new virtual compute instance that is sought to be launched with an attached virtual GPU.

One of the requests 680A-680N may specify one or more constraints for selection of the virtual GPU(s). In one embodiment, the constraint(s) may indicate a virtual GPU class (also referred to as a virtual GPU type) associated with selection of the virtual GPU(s). The provider network 100 may offer virtual GPU resources in a variety of classes. The virtual GPU classes may vary in terms of one or more GPU characteristics, such as processor resources, memory resources, and/or other traits of the virtual GPU. In one embodiment, various classes of virtual GPUs may range from "small" to "large" in terms of estimated processing power. The virtual GPU class constraint in an attachment request may directly specify one or more virtual GPU classes or may instead indicate resource requirements that the elastic graphics service 110 may map to a particular virtual GPU class.

In one embodiment, the constraint(s) may include one or more location constraints associated with selection of the virtual GPU(s). The provider network 100 may offer virtual GPU resources implemented using graphics servers in a variety of locations. The locations of the graphics servers may include different data centers, different racks within data centers, different regions (e.g., as determined by geographic, political, business-oriented, and/or arbitrary boundaries), different availability zones, different subdivisions of a network or other indicators of network locality, and other suitable locations. In one embodiment, a region may include multiple availability zones. At least some of the resources within a region may be isolated from those in other regions. Availability zones within a region may be somewhat independent but may be connected to one another through low-latency links. In one embodiment, connections between resources within the same availability zone may often have lower latency than connections from zone to zone. The location constraint(s) associated with an attachment request may seek to locate the virtual GPU (or the physical resources used to implement it) sufficiently close to the virtual compute instance (or the physical resources used to implement it), e.g., to reduce latency for communication between the physical resources. The location constraint(s) may specify the location for the requested virtual GPU and/or the location for the virtual compute instance for which attachment is sought. In various embodiments, location constraints may include a network locality constraint restricting a virtual GPU to a particular portion of a network, a geographical constraint restricting a virtual GPU to one or more regions or availability zones, and/or other suitable constraints.

A data store 650 may maintain availability information for virtual GPUs in the provider network 100. The availability information may indicate the reservation or availability status for virtual GPU resources offered in the provider network 100. In one embodiment, identifiers of virtual GPUs may be marked with a status such as "reserved" (or "unavailable") or "available" (or "unreserved") in the data store 650. A virtual GPU marked as reserved may be reserved on behalf of a particular client and/or virtual compute instance (for attachment to that instance), whereas a virtual GPU marked as available may be freely assigned to a virtual compute instance associated with a suitable attachment request. The data store 650 may be implemented using any suitable storage and/or database technologies, potentially including one or more services or resources within the provider network 100. In one embodiment, the data store 650 may be implemented using a relational database management system. In one embodiment, the data store 650 may be implemented using a NoSQL database service such as DynamoDB from Amazon. The data store 650 may offer a conditional update operation, e.g., so that an attempt to mark a virtual GPU as reserved may fail if the availability status of the virtual GPU has already been marked as reserved by another request.

The data store 650 may be segmented (or partitioned) according to various potential constraints. As shown in the example of FIG. 6, the virtual GPU availability information may be segmented for one or more constraints A (virtual GPU availability information 660A) through Z (virtual GPU availability information 660Z). The availability information 660A-660Z may also be referred to as capacity information. In one embodiment, the data store 650 may be segmented according to the set of allowed values for a single type of constraint. For example, the virtual GPU availability information 660A in segment 655A may indicate the availability status for virtual GPUs sharing one value A for a location constraint, while the virtual GPU availability information 660Z in segment 655Z may indicate the availability status for virtual GPUs having another value Z for the location constraint. As another example, the virtual GPU availability information 660A may indicate the availability status for virtual GPUs sharing one value A for a virtual GPU class constraint, while the virtual GPU availability information 660Z may indicate the availability status for virtual GPUs having another value Z for the virtual GPU class constraint. In one embodiment, the data store 650 may be segmented according to the values for a combination of two or more constraints, such that A represents one combination of values for multiple constraints while Z represents another combination of values for multiple constraints. For example, the segment 655A may indicate the availability status 660A for virtual GPUs sharing one value for a location constraint and one value for a virtual GPU class constraint; other segments, such as segment 655Z with virtual GPU availability information 660Z, may differ in their value for the location constraint and/or in their value for the virtual GPU class constraint. The segments 655A-655Z may be implemented using partitions or any other suitable database technology. Although segments 655A-655Z are shown for purposes of illustration and example, any suitable number and configuration of segments may be stored in the data store 650. The segmentation of the availability information 660A-660Z may reduce contention for individual elements of the availability information in processing many concurrent requests 680A-680N.

Figure 7:
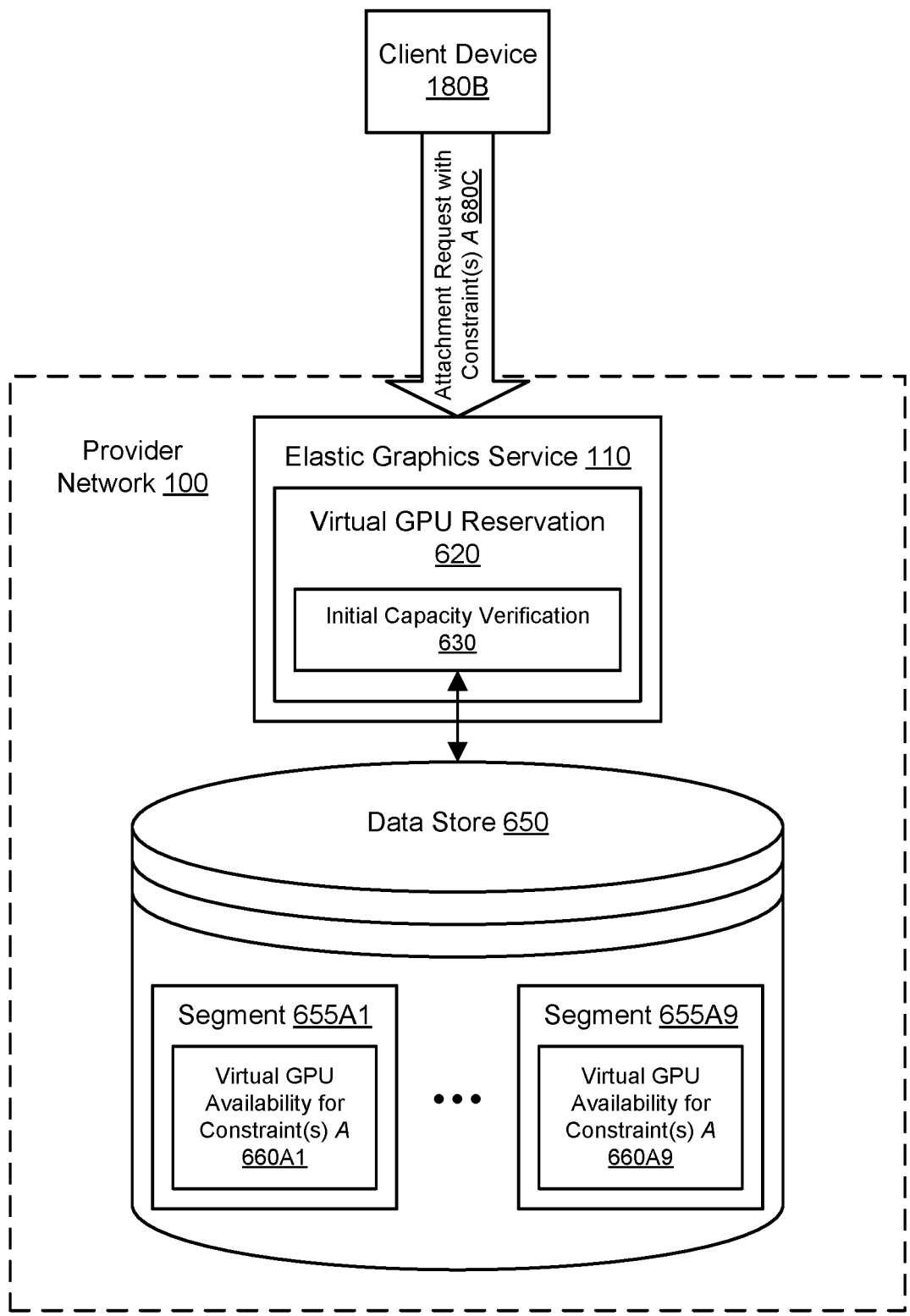
FIG. 7 illustrates further aspects of the example system environment for capacity reservation for virtualized graphics processing, including an initial capacity verification using constraint-specific segments of a data store, according to one embodiment.

FIG. 7 illustrates further aspects of the example system environment for capacity reservation for virtualized graphics processing, including an initial capacity verification using constraint-specific segments of a data store, according to one embodiment. As shown in the example of FIG. 7, an attachment request 680C for one or more virtual GPUs may be sent by a client 180B to the elastic graphics service 110. The attachment request 680C may indicate or be associated with one or more constraints (e.g., values for constraints) A. For example, the constraint(s) A may indicate a particular virtual GPU class (or range of classes), a particular location in which the virtual GPU should be located, or both. As discussed above, the availability information in the data store 650 may be segmented according to one or more constraints. Each combination of values for constraints may be represented by one or more segments in the data store 650. As shown in the example of FIG. 7, the constraint(s) A may be represented by segments 655A1 (including virtual GPU availability information 660A1, a subset of virtual GPU availability information 660A) through 655A9 (including virtual GPU availability information 660A9, a subset of virtual GPU availability information 660A). The virtual GPUs identified in segments 655A1-655A9 may share the values for one or more constraints. For example, the virtual GPUs identified in segments 655A1-655A9 may share a common virtual GPU class and/or a common location.

Figure 8:
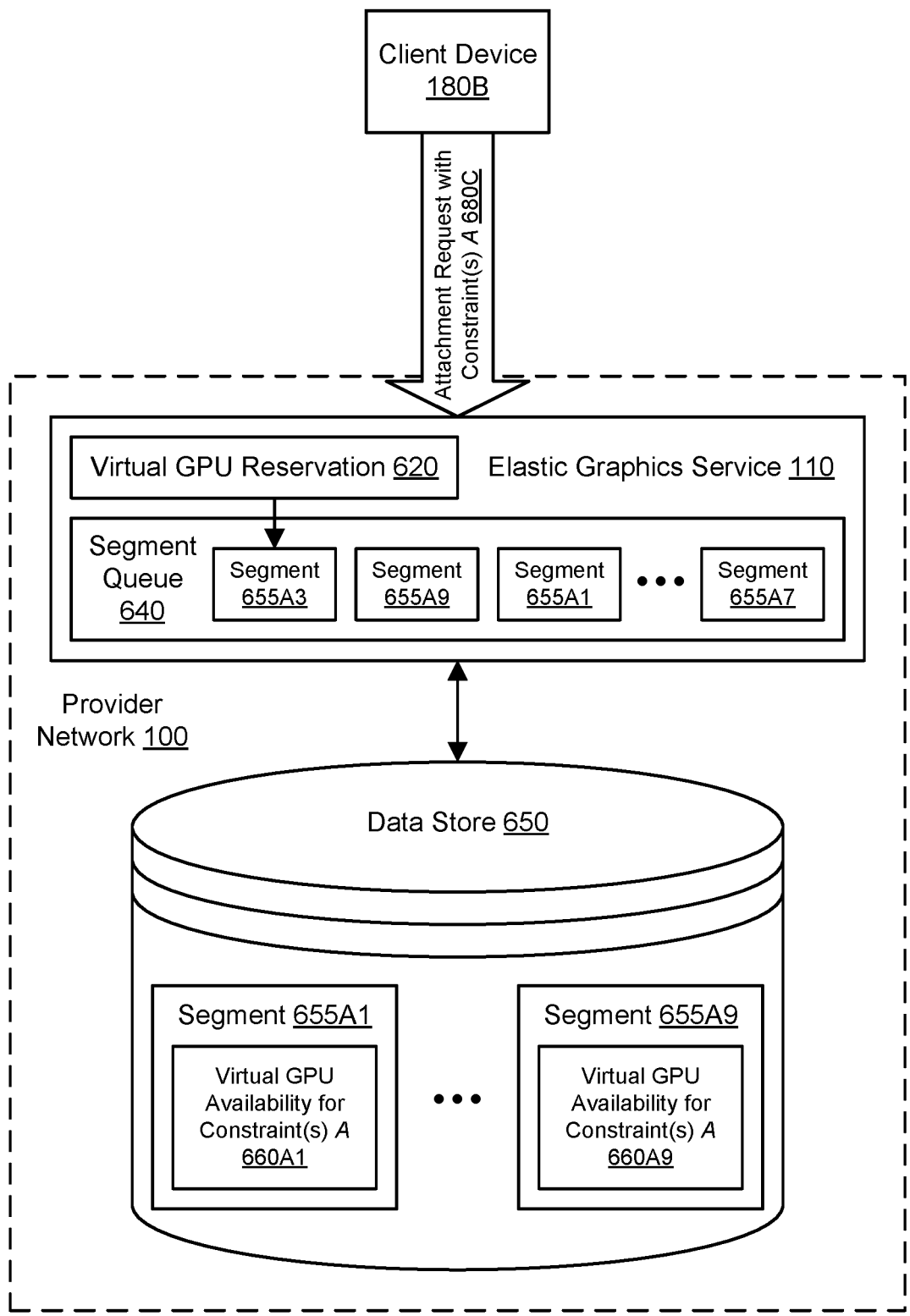
FIG. 8 illustrates further aspects of the example system environment for capacity reservation for virtualized graphics processing, including the enqueuing of constraint-specific segments of a data store, according to one embodiment.

In one embodiment, the virtual GPU reservation component 620 may include an initial capacity verification component 630. Upon receiving an attachment request such as request 680C, the initial capacity verification component 630 may perform an initial verification that the requested capacity is indeed available. The requested capacity may represent the requested number of virtual GPUs along with their constraint(s). In one embodiment, the initial capacity verification 630 may query the data store 650 across one or more of the segments 655A1-655A9 that are relevant to the constraint(s) in the request 680C. If the one or more queries determine that the requested capacity is currently available, then the capacity reservation process may proceed, e.g., as shown in FIG. 8. If the one or more queries determine that the requested capacity is currently unavailable, then the capacity reservation process may fail, and the client 180B may be notified that the requested capacity is currently unavailable.

FIG. 8 illustrates further aspects of the example system environment for capacity reservation for virtualized graphics processing, including the enqueuing of constraint-specific segments of a data store, according to one embodiment. To process the request 680C, a segment queue 640 may be populated with segments (or identifiers thereof) that are associated with the one or more constraints in the request. The queue 640 may represent a data structure in which items are ordered from first to last. In one embodiment, the constraint-specific segments may initially be placed in the queue in a random order. As used herein, the term "random" is intended to represent randomness and/or pseudo-randomness. As shown in the example of FIG. 8, the segments may be ordered randomly such that segment 655A3 is first in the queue 640, segment 655A9 is second in the queue, segment 655A1 is third in the queue, and segment 655A7 is last in the queue. As will be discussed further below, the virtual GPU reservation 620 may look to the first segment in the queue (e.g., currently segment 655A3 in the example of FIG. 8) when attempting to reserve virtual GPU resources for the request 680C. The random ordering of segments in a queue used to process attachment requests may reduce contention for individual elements of the availability information in processing many concurrent requests (such as requests 680A-680N).

Figure 9:
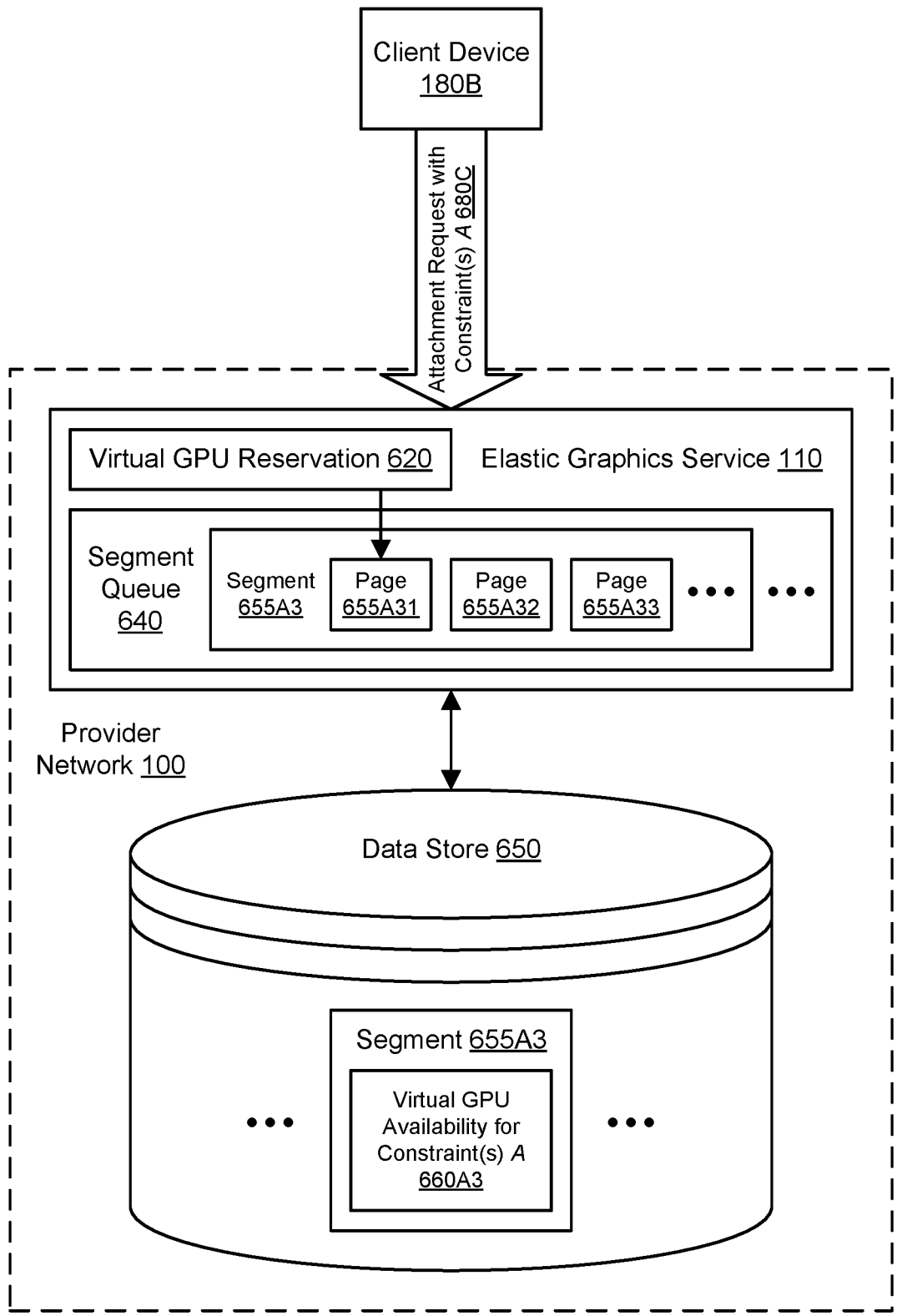
FIG. 9 illustrates further aspects of the example system environment for capacity reservation for virtualized graphics processing, including the selection of a page of virtual GPU availability data from a constraint-specific segment of a data store, according to one embodiment.

FIG. 9 illustrates further aspects of the example system environment for capacity reservation for virtualized graphics processing, including the selection of a page of virtual GPU availability data from a constraint-specific segment of a data store, according to one embodiment. As shown in the example of FIG. 9, the virtual GPU reservation 620 may look to segment 655A3, currently the first segment in the queue, when attempting to reserve virtual GPU resources for the request 680C. Segment 655A3 may include virtual GPU availability information 660A3, a subset of virtual GPU availability information 660A. Segment 655A3 may include availability information for a sufficient number of currently available virtual GPUs that the availability information can be further divided into a set of pages. As shown in the example of FIG. 9, the segment 655A3 may be divided into pages 655A31, 655A32, 655A33, and so on. In one embodiment, the pages 655A31-655A33 may be determined internally by the data store 650, e.g., based on a query of the segment 655A3 for virtual GPUs that are currently available and that meet the constraint(s) A in the request 680C. In one embodiment, the data store 650 may return one page at a time, starting with the first page 655A31 of query results. The virtual GPU reservation 620 may then request additional pages of query results, e.g., by specifying the last item in the previous page.

The division of segments into pages may reduce contention for individual elements of the availability information in processing many concurrent requests (such as requests 680A-680N). The number of pages resulting from a capacity query may vary according to the number of virtual GPU resources in the segment and also according to the size of a page (e.g., the number of virtual GPUs in a page). The page size may be configurable to further reduce contention on individual elements of the availability information. In one embodiment, the virtual GPU reservation 620 may look to the first page in a sequential order of the pages 655A31-655A33 to attempt to make a reservation. In one embodiment, to further reduce contention, the virtual GPU reservation 620 may look to a random page in a sequential order of the pages 655A31-655A33 to attempt to make a reservation.

Figure 10:
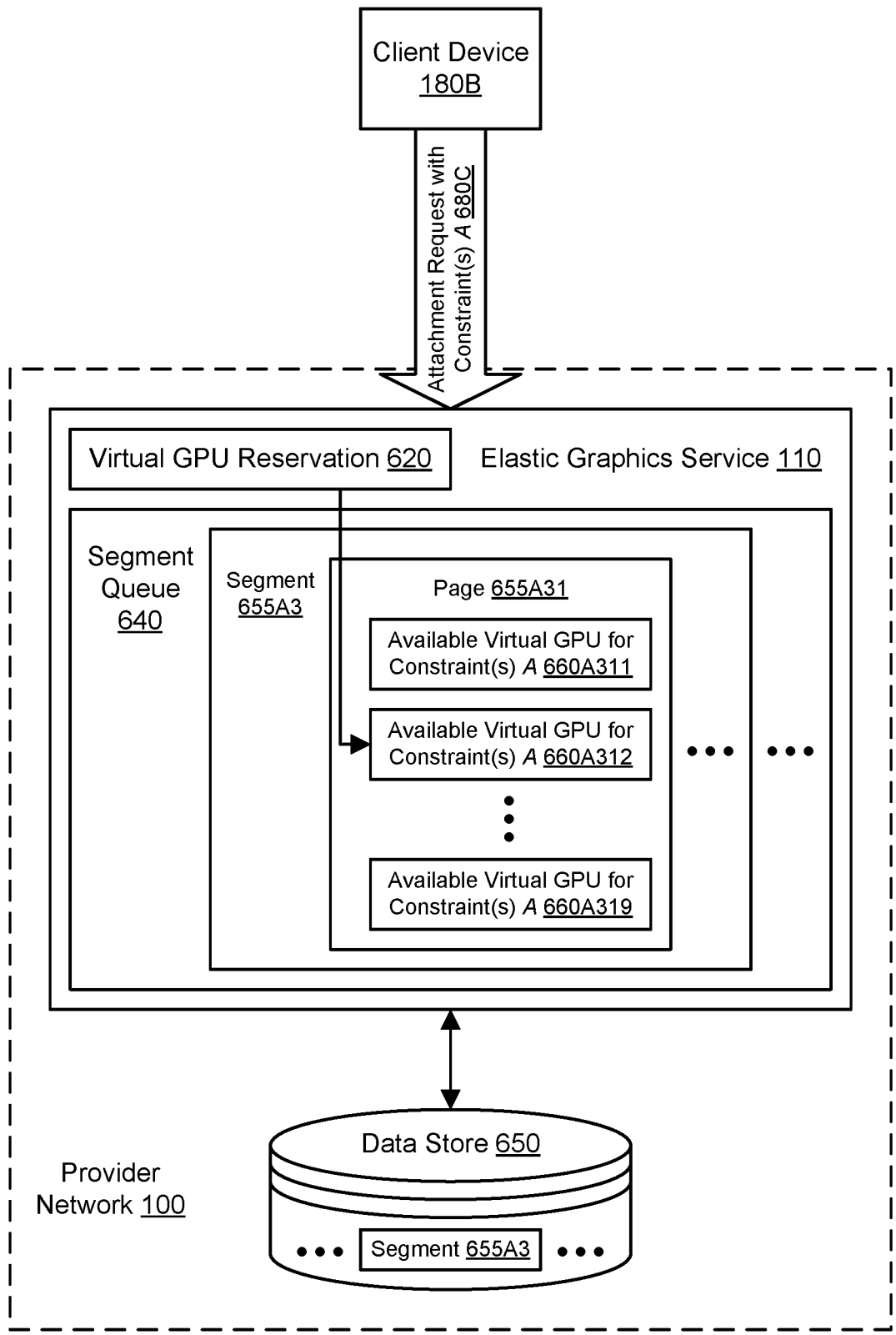
FIG. 10 illustrates further aspects of the example system environment for capacity reservation for virtualized graphics processing, including the random selection of an available virtual GPU from within a page of virtual GPU availability data, according to one embodiment.

FIG. 10 illustrates further aspects of the example system environment for capacity reservation for virtualized graphics processing, including the random selection of an available virtual GPU from within a page of virtual GPU availability data, according to one embodiment. The page 655A31 may include records representing availability information for a set of virtual GPUs. As shown in the example of FIG. 10, the page 655A31 may list records such as an available virtual GPU 660A311 that meets the constraint(s) A, another available virtual GPU 660A312 that meets the constraint(s) A, yet another available virtual GPU 660A319 that meets the constraint(s) A, and potentially additional available virtual GPUs that meet the constraint(s) A. In one embodiment, the virtual GPU reservation 620 may look to the first record within the page 655A31 to attempt to make a reservation, then the next record, and so on. In one embodiment, to reduce contention on individual records, the virtual GPU reservation 620 may look to a random record within the page 655A31 to attempt to make a reservation. As shown in the example of FIG. 10, the random record happens to represent the virtual GPU 660A312. The virtual GPU reservation component 620 may attempt to mark this record 660A312 as reserved. In one embodiment, attempting to mark a record as reserved may include performing a conditional update in the data store 650.

The virtual GPUs 660A311, 660A312, and 660A319 may be marked as available in the data store at the time the page 655A31 is generated and sent to the virtual GPU reservation component 620. However, one or more of the virtual GPUs 660A311, 660A312, and 660A319 may have been marked as reserved on behalf of a different attachment request after the page 655A31 is sent to the virtual GPU reservation component 620. In such a scenario, the attempt to mark the record 660A312 may fail, e.g., the conditional update of the record may fail. If an attempt to reserve one record fails, the virtual GPU reservation component 620 may try again with another record in the same page 655A31. In one embodiment, the virtual GPU reservation component 620 may keep trying to reserve virtual GPUs within a page until the entire page is exhausted, e.g., when it contains no more available virtual GPUs. In one embodiment, the virtual GPU reservation component 620 may fail up to a threshold number of times before moving to a different page. In one embodiment, the virtual GPU reservation component 620 may move to another page within the same segment (e.g., page 655A32) if page 655A31 is exhausted. In one embodiment, if page 655A31 is exhausted, the virtual GPU reservation component 620 may move the current segment 655A3 to the end of the queue and move to a page in the next segment in the queue (e.g., segment 655A9) to attempt to reserve the requested capacity. In one embodiment, if all the pages in a segment are exhausted, the virtual GPU reservation component 620 may remove that segment 655A3 from the queue. If all the segments are exhausted before all of the requested capacity can be reserved, then the entire request may fail, and the client 180B may be notified accordingly. In one embodiment, the virtual GPU reservation component 620 may attempt to revert any successful reservations (e.g., by marking them as available) if only part of the requested capacity was reserved before the entire request failed. In one embodiment, the request may fail if a threshold amount of time is reached before all of the requested capacity can be reserved successfully.

Figure 11:
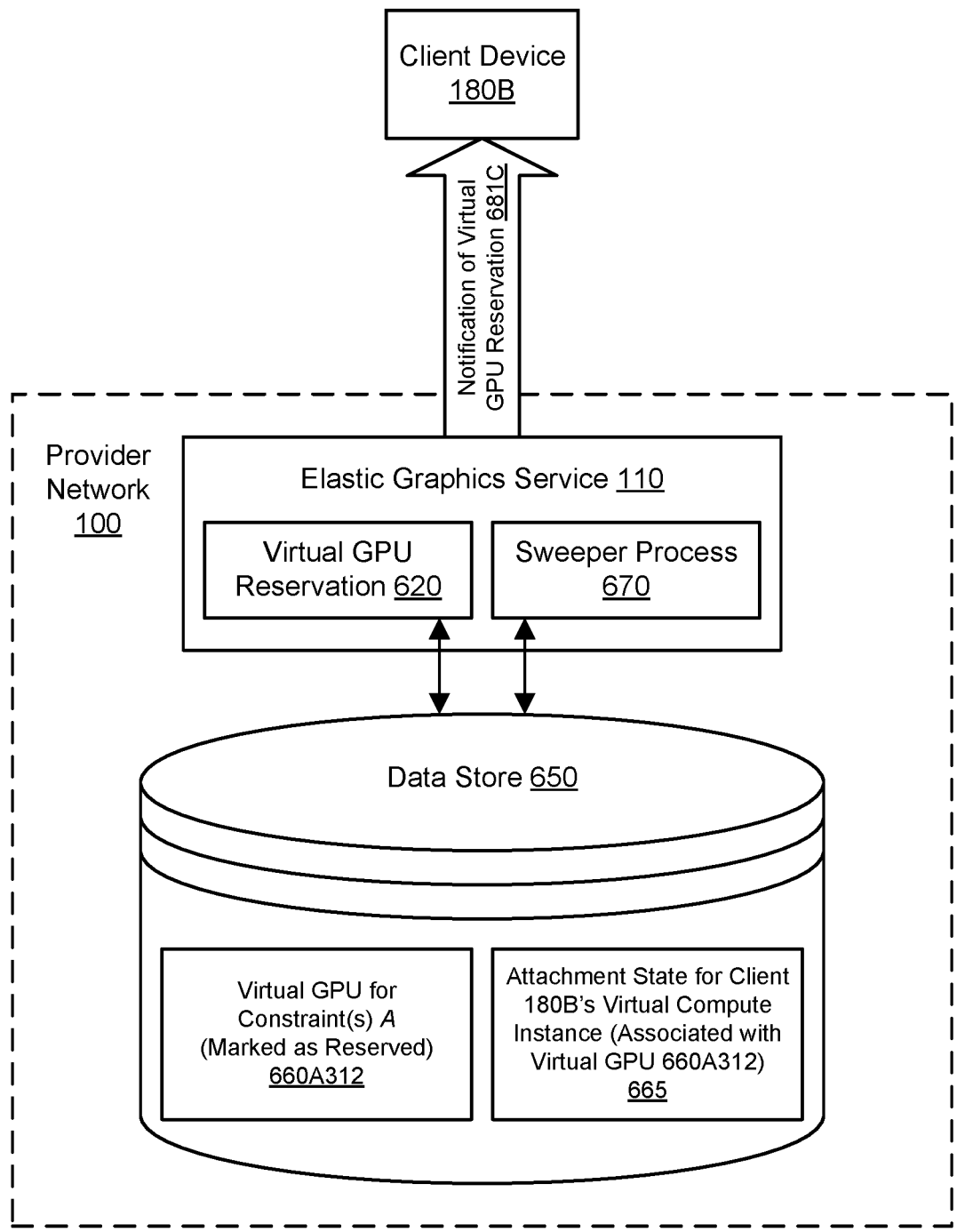
FIG. 11 illustrates further aspects of the example system environment for capacity reservation for virtualized graphics processing, including the reservation of a selected virtual GPU and the association of the selected virtual GPU with a virtual compute instance, according to one embodiment.

FIG. 11 illustrates further aspects of the example system environment for capacity reservation for virtualized graphics processing, including the reservation of a selected virtual GPU and the association of the selected virtual GPU with a virtual compute instance, according to one embodiment. If a reservation attempt succeeds, the elastic graphics service 110 may send a notification 681C of the virtual GPU reservation to one or more entities such as the client 180B. Following the successful reservation, the selected virtual GPU 660A312 may be attached to a virtual compute instance associated with the client 180B that generated the attachment request 680C. A physical compute instance that implements the virtual compute instance may communicate over a network with a graphics server that includes a physical GPU used to implement the virtual GPU. The virtual compute instance may be configured to execute applications using the virtualized graphics processing provided by the virtual GPU.

If a reservation attempt succeeds, the data store 650 may be updated to indicate the status change. In the example of FIG. 11, the attempt to reserve the virtual GPU 660A312 for the request 680C was successful, and so the individual record for that virtual GPU may be modified to update the status from "available" to "reserved." In one embodiment, the data store 650 may include an additional table that indicates the attachment state 665 for the virtual compute instance for which the virtual GPU 660A312 was requested. The attachment state 665 may also be updated to reference the virtual GPU 660A312. In some circumstances, the attachment may not be performed as expected (e.g., due to a failure or error in the provider network 100), or the virtual compute instance may never actually utilize the attached virtual GPU. In one embodiment, a sweeper process 670 may asynchronously and/or periodically analyze relevant data in the data store 650 (and potentially elsewhere) to identify virtual GPUs that are marked as reserved but not successfully attached or utilized. For example, if the attachment of a virtual GPU to a virtual compute instance is never performed, then the virtual GPU availability state in one table may be inconsistent with the virtual compute instance attachment state in another table. The sweeper process 670 may mark such virtual GPUs as available in the data store 650.

Figure 12:
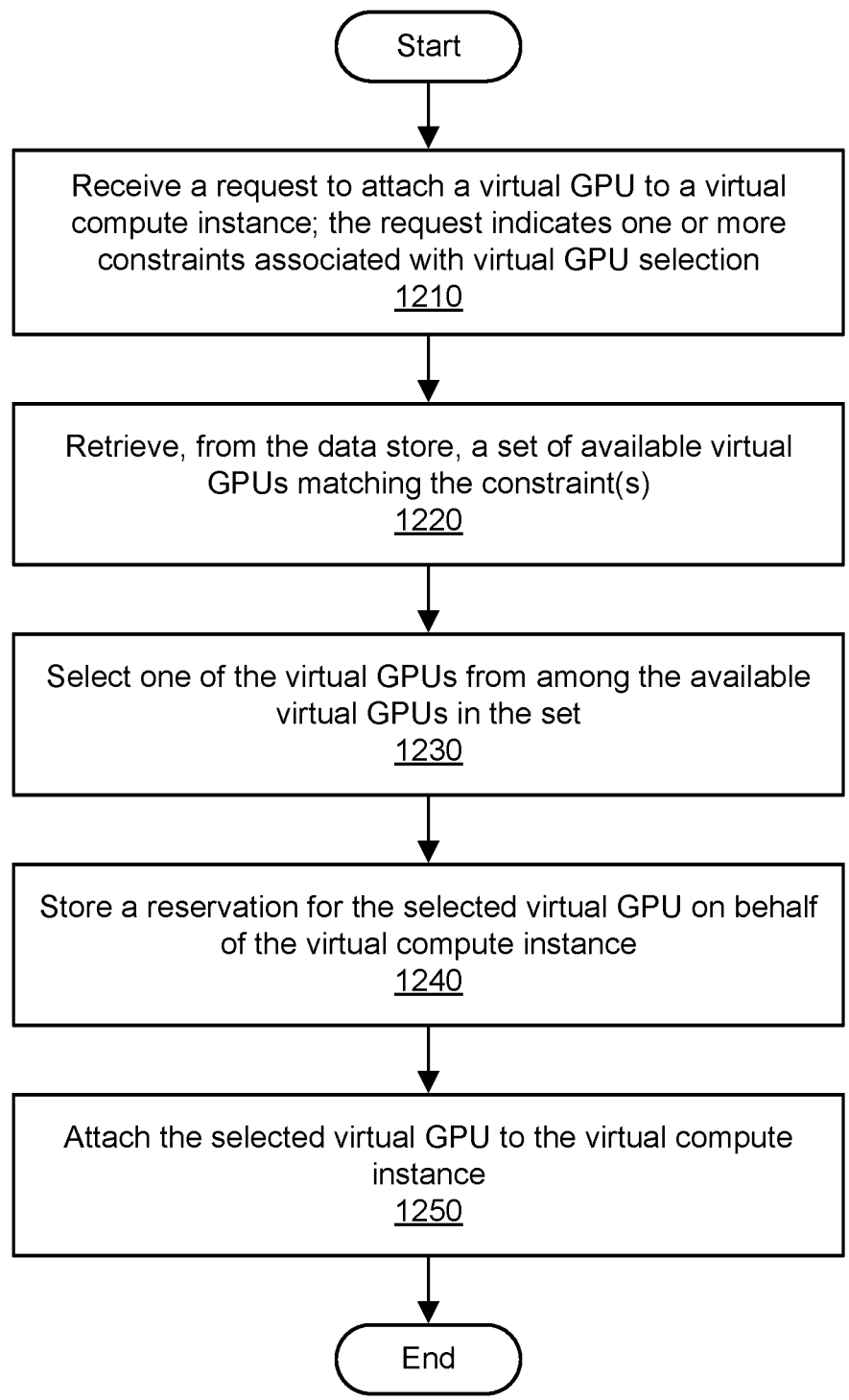
FIG. 12 is a flowchart illustrating a method for providing capacity reservation for virtualized graphics processing, according to one embodiment.

FIG. 12 is a flowchart illustrating a method for providing capacity reservation for virtualized graphics processing, according to one embodiment. As shown in 1210, a request may be received to attach a virtual GPU to a virtual compute instance. The request may indicate or otherwise be associated with one or more constraints associated with selection of the virtual GPU. For example, the constraint(s) may include a virtual GPU class and/or a location in which the requested virtual GPU (or its physical implementation in a graphics server) should be located. In one embodiment, the request may also request attachment of one or more additional virtual GPUs to the same instance or to one or more different instances, with the same constraint(s) or different constraint(s).

As shown in 1220, a set of availability information may be retrieved from a data store that maintains availability information for virtual GPUs in the provider network. The availability information may indicate a set of virtual GPUs that are marked in the data store as available at the time the page is generated and that match the constraint(s) in the request. The availability information may be part of a page, and the page may be generated using a query of the data store. The query may specify the constraint(s). The page may belong to a segment of the data store (potentially one of several such segments) that includes records matching the specified constraint(s). The results of the query, e.g., the set of records for available virtual GPUs that meet the specified constraint(s), may be broken down into pages by the data store. The retrieved page may represent the first page in an ordered sequence of pages or a random page within the ordered sequence.

As shown in 1230, one of the virtual GPUs may be selected from among the available virtual GPUs in the set. Attempts to reserve the requested virtual GPU(s) may be made within the set (e.g., using a random selection within the set) until the reservation is successful, or otherwise the reservation attempts may be tried for a different page within the same segment or a different segment. Various techniques may be used to reduce contention for concurrent requests, such as segmenting the data store into segments and further into pages, randomly selecting segments, randomly selecting pages within segments, and/or randomly selecting virtual GPUs within pages.

As shown in 1240, a reservation of the selected virtual GPU on behalf of the virtual compute instance may be stored in the data store. Storing the reservation may include updating an availability status of the selected virtual GPU from "available" to "reserved." As shown in 1250, the selected virtual GPU may be attached to the virtual compute instance. A physical compute instance that implements the virtual compute instance may communicate over a network with a graphics server that includes a physical GPU used to implement the virtual GPU. The virtual compute instance may send graphics instructions to the virtual GPU over a network, e.g., such that the virtual GPU provides graphics processing or GPGPU processing for the instance. In one embodiment, an attachment status of the virtual compute instance may also be updated in the data store to reflect the successful attachment of the selected virtual GPU.

Figure 13A:
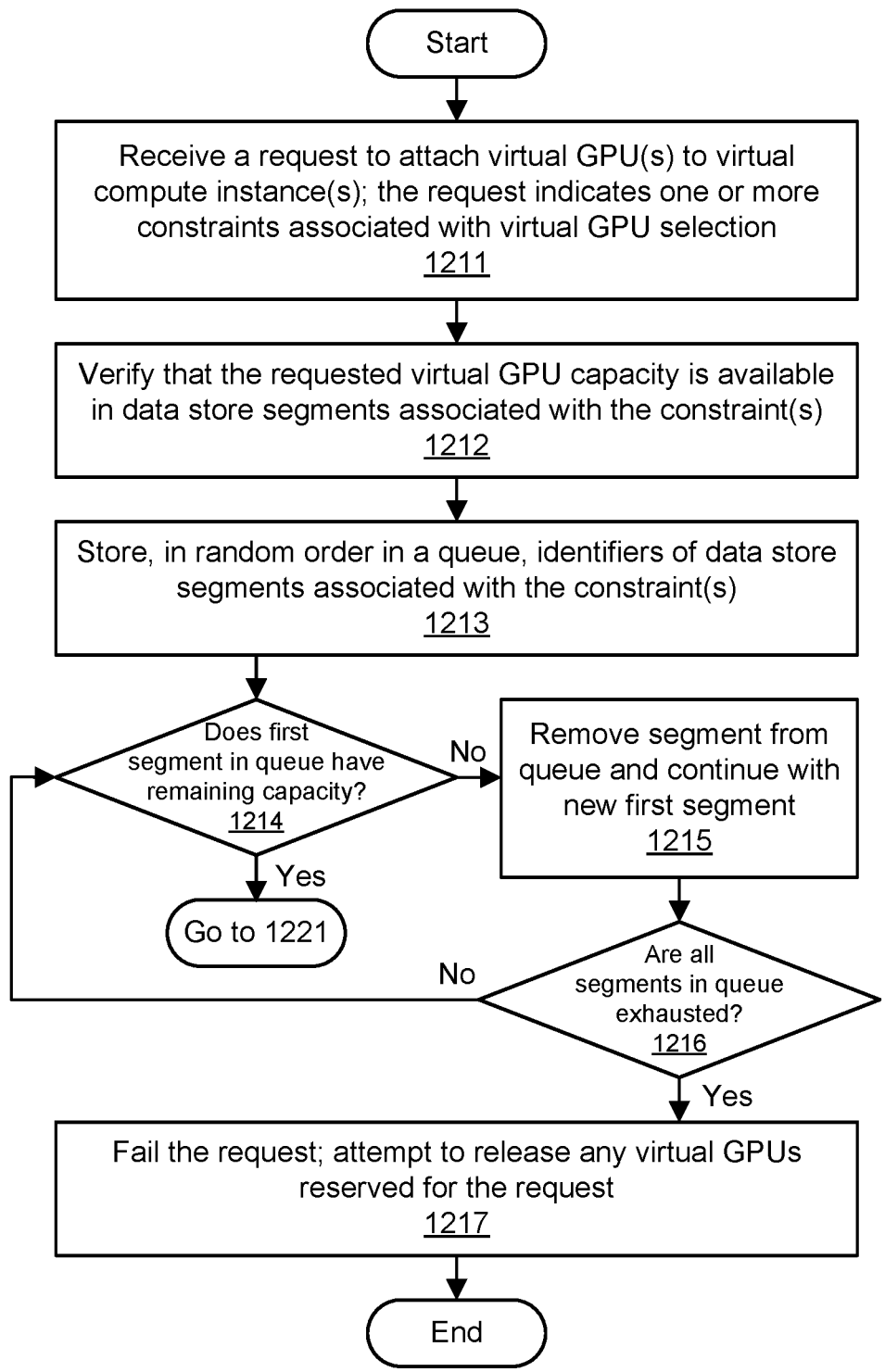
FIGS. 13A and 13B are flowcharts illustrating further aspects of the method for providing capacity reservation for virtualized graphics processing, according to one embodiment.
Figure 13B:
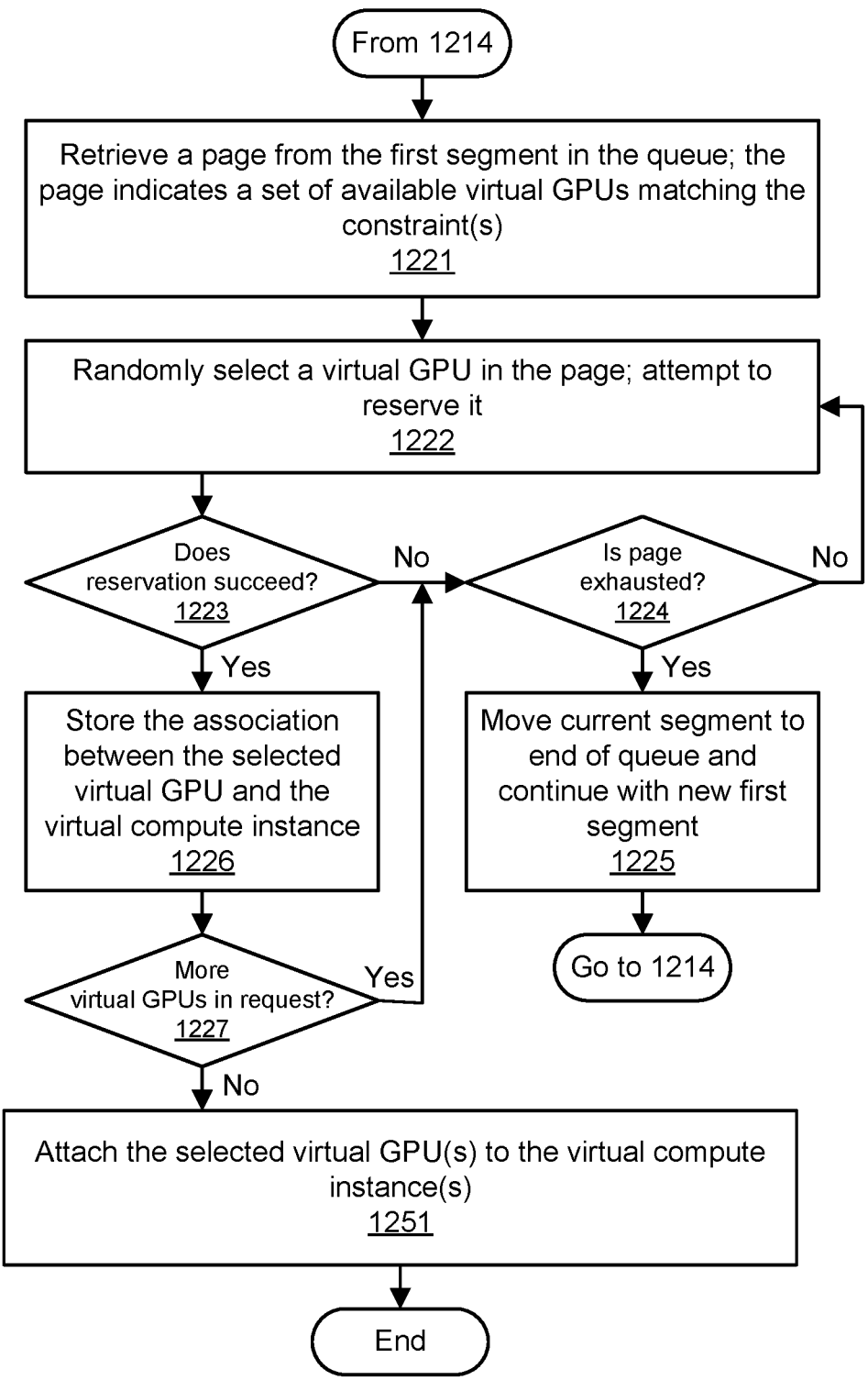

FIGS. 13A and 13B are flowcharts illustrating further aspects of a method for providing capacity reservation for virtualized graphics processing, according to one embodiment. As shown in 1211, a request may be received to attach one or more virtual GPUs to one or more virtual compute instance. The request may indicate or otherwise be associated with one or more constraints associated with selection of the virtual GPU(s). For example, the constraint(s) may include a virtual GPU class and/or a location in which the requested virtual GPU(s) (or its physical implementation in a graphics server) should be located.

As shown in 1212, the availability of the requested virtual GPU capacity may be verified. The requested capacity may represent the requested number of virtual GPUs along with their constraint(s). In one embodiment, the initial capacity verification may query the data store across one or more of the segments that are relevant to the constraint(s) in the request. If the one or more queries determine that the requested capacity is currently available, then the capacity reservation process may proceed, e.g., as shown in 1213. If the one or more queries determine that the requested capacity is currently unavailable, then the capacity reservation process may fail, and the client may be notified that the requested capacity is currently unavailable.

As shown in 1213, segments of the data store (or identifiers thereof) that are associated with the requested constraint(s) may be placed in a queue. The segments may be enqueued in a random order to reduce contention for concurrent requests. As shown in 1214, the method may determine whether the first segment in the queue has any remaining capacity, e.g., whether it lists any available virtual GPUs. If not, then as shown in 1215, the segment may be removed from the queue, and the method may continue with the next segment (now representing the first segment in the queue). As shown in 1216, the method may determine whether all the segments in the queue have been exhausted. If so, then as shown in 1217, the request may fail. In one embodiment, the method may attempt to release any virtual GPUs that were reserved for the failed request, e.g., by marking their records as "available." If not all the segments in the queue are exhausted, then the method may proceed again to the operation shown in 1214. If the current first segment in the queue does have remaining capacity (e.g., one or more available virtual GPUs), then the method may proceed from 1214 to 1221.

As shown in 1221, a page may be retrieved from the current first segment in the queue. The page may be a first page of query results or, to further reduce contention, a random page from within a set of pages of query results. The retrieved page may indicate a set of virtual GPUs that match the specified constraint(s) and that were marked as available in the data store when the page of query results was generated. As shown in 1222, a virtual GPU may be randomly selected within the page. The method may attempt to reserve the selected virtual GPU for the request, e.g., by performing a conditional update to its status in the data store from "available" to "reserved." As shown in 1223, it may be determined whether the reservation attempt was successful. For example, the reservation attempt may be unsuccessful if the virtual GPU was reserved for another request after the page was generated in which the virtual GPU was marked as available. If the reservation attempt fails, then as shown in 1224, it may be determined whether the page is exhausted. If one or more virtual GPUs are still available within the page, then the method may proceed again to the operation shown in 1222. If the page is exhausted, then as shown in 1225, the current segment may be moved to the end of the queue, and the method may proceed as shown in 1214 with the new first segment in the queue.

If the reservation attempt is successful, then as shown in 1226, the association between the selected virtual GPU and the virtual compute instance associated with the request may be stored in the data store. As shown in 1227, it may be determined whether there are additional GPUs in the request to attempt to reserve. If so, then the method may proceed as shown in 1224. If not, then the selected virtual GPU(s) may be attached to the corresponding virtual compute instance(s). In one embodiment, an attachment status of the virtual compute instance may also be updated in the data store to reflect the successful attachment of the selected virtual GPU.

Illustrative Computer System

In at least some embodiments, a computer system that implements a portion or all of one or more of the technologies described herein may include a computer system that includes or is configured to access one or more computer-readable media. FIG. 14 illustrates such a computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 14 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more computing devices that implement an elastic graphics service configured to:
receive a request to attach a virtual graphics processing unit (GPU) to a virtual compute instance that is executing in a provider network, wherein the virtual compute instance is implemented using at least physical central processing unit (CPU) resources in the provider network, and wherein the virtual GPU is implemented using a physical GPU in the provider network, wherein the physical GPU is accessible to the physical CPU resources over a network, and responsive to the received request:
retrieve availability information that indicates available virtual GPUs in the provider network;
determine a selected virtual GPU from among the available virtual GPUs; and
attach the selected virtual GPU to the virtual compute instance.

2. The system as recited in claim 1, the elastic graphics service further configured to:
prior to the attaching:
reserve the selected virtual GPU for the virtual compute instance; and
update the availability information to remove the selected virtual GPU from the available virtual GPUs.

3. The system as recited in claim 2, wherein the request indicates a plurality of requested virtual GPUs, and wherein the elastic graphics service further configured to:
revert the reservation of the selected virtual GPU responsive to a failure to reserve one or more of the plurality of requested virtual GPUs.

4. The system as recited in claim 1, wherein the request comprises a constraint comprising:
an indication of a virtual GPU class of the virtual GPU;
a network locality constraint associated with the virtual GPU; or
a geographical constraint associated with the virtual GPU; and
wherein the availability information indicates available virtual GPUs matching the constraint.

5. The system as recited in claim 1, wherein:
to retrieve the availability information the elastic graphics service configured to retrieve a page of query results comprising data indicative of a plurality of virtual GPUs available in the provider network, and
the page is retrieved in a random order from among a plurality of pages listing available virtual GPUs.

6. The system as recited in claim 1, wherein the selected virtual GPU is determined randomly from among the available virtual GPUs.

7. A computer-implemented method, comprising:
receiving a request to attach a virtual graphics processing unit (GPU) to a virtual compute instance that is executing in a provider network, wherein the virtual compute instance is implemented using at least physical central processing unit (CPU) resources in the provider network, and wherein the virtual GPU is implemented using a physical GPU in the provider network, wherein the physical GPU is accessible to the physical CPU resources over a network, and responsive to the received request:
retrieving availability information that indicates available virtual GPUs in the provider network;
determining a selected virtual GPU from among the available virtual GPUs; and
attaching the selected virtual GPU to the virtual compute instance.

8. The computer-implemented method as recited in claim 7, further comprising performing, prior to the attaching:
reserving of the selected virtual GPU for the virtual compute instance; and
updating the availability information to remove the selected virtual GPU from the available virtual GPUs.

9. The computer-implemented method as recited in claim 8, wherein determining the selected virtual GPU from among the available virtual GPUs is responsive to failing to reserve another virtual GPU from among the available virtual GPUs.

10. The method as recited in claim 8, wherein the request indicates a plurality of requested virtual GPUs, and wherein the method further comprises:
reverting the reservation of the selected virtual GPU responsive to a failure to reserve one or more of the plurality of requested virtual GPUs.

11. The computer-implemented method as recited in claim 7, wherein the request comprises a constraint comprising:
an indication of a virtual GPU class of the virtual GPU;
a network locality constraint associated with the virtual GPU; or
a geographical constraint associated with the virtual GPU; and
wherein the availability information indicates available virtual GPUs matching the constraint.

12. The computer-implemented method as recited in claim 7, wherein:
retrieving the availability information comprises retrieving a page of query results comprising data indicative of a plurality of virtual GPUs available in the provider network, and
the page is retrieved in a sequential order from among a plurality of pages listing available virtual GPUs.

13. The computer-implemented method as recited in claim 7, wherein the selected virtual GPU is determined randomly from among the available virtual GPUs.

14. One or more non-transitory computer-readable storage media storing program instructions that when executed on or across one or more processors cause the one or more processors to perform:
receiving a request to attach a virtual graphics processing unit (GPU) to a virtual compute instance that is executing in a provider network, wherein the virtual compute instance is implemented using at least physical central processing unit (CPU) resources in the provider network, and wherein the virtual GPU is implemented using a physical GPU in the provider network, wherein the physical GPU is accessible to the physical CPU resources over a network, and responsive to the received request:
retrieving availability information that indicates available virtual GPUs in the provider network;
determining a selected virtual GPU from among the available virtual GPUs; and
attaching the selected virtual GPU to the virtual compute instance.

15. The one or more non-transitory computer-readable storage media as recited in claim 14, the program instructions that when executed on or across one or more processors cause the one or more processors to further perform, prior to the attaching:
reserving the selected virtual GPU for the virtual compute instance; and
updating the availability information to remove the selected virtual GPU from the available virtual GPUs.

16. The one or more non-transitory computer-readable storage media as recited in claim 15, wherein determining the selected virtual GPU from among the available virtual GPUs is responsive to failing to reserve another virtual GPU from among the available virtual GPUs.

17. The one or more non-transitory computer-readable storage media as recited in claim 15, the program instructions that when executed on or across one or more processors cause the one or more processors to further perform:
reverting the reservation of the selected virtual GPU responsive to a failure to reserve one or more of the plurality of requested virtual GPUs.

18. The one or more non-transitory computer-readable storage media as recited in claim 14, wherein the request comprises a constraint comprising:
an indication of a virtual GPU class of the virtual GPU;
a network locality constraint associated with the virtual GPU; or
a geographical constraint associated with the virtual GPU; and
wherein the availability information indicates available virtual GPUs matching the constraint.

19. The one or more non-transitory computer-readable storage media as recited in claim 14, wherein:
- retrieving the availability information comprises retrieving a page of query results comprising data indicative of a plurality of virtual GPUs available in the provider network, and
- the page is retrieved in a random order from among a plurality of pages listing available virtual GPUs.

20. The one or more non-transitory computer-readable storage media as recited in claim 14, wherein the selected virtual GPU is determined randomly from among the available virtual GPUs.

* * * * *